United States Patent
Strom et al.

(10) Patent No.: US 10,218,735 B2
(45) Date of Patent: Feb. 26, 2019

(54) NETWORK ATTACK SIMULATION SYSTEMS AND METHODS

(71) Applicant: The MITRE Corporation, McLean, VA (US)

(72) Inventors: Blake E. Strom, Ellicott City, MD (US); Christopher Korban, Washington, DC (US); Ross D. Wolf, Columbia, MD (US); Douglas Miller, Hanover, MD (US); Andrew Applebaum, McLean, VA (US)

(73) Assignee: The MITRE Corporation, McLean, VA (US)

( * ) Notice: Subject to any disclaimer, the term of this patent is extended or adjusted under 35 U.S.C. 154(b) by 170 days.

(21) Appl. No.: 15/180,336

(22) Filed: Jun. 13, 2016

(65) Prior Publication Data
US 2017/0006055 A1    Jan. 5, 2017

Related U.S. Application Data

(60) Provisional application No. 62/186,906, filed on Jun. 30, 2015.

(51) Int. Cl.
*H04L 29/06* (2006.01)
*G06F 17/50* (2006.01)

(52) U.S. Cl.
CPC ...... *H04L 63/1433* (2013.01); *G06F 17/5009* (2013.01)

(58) Field of Classification Search
CPC ................................ H04L 29/06; G06F 17/50
See application file for complete search history.

(56) References Cited

U.S. PATENT DOCUMENTS

| 7,315,801 | B1 | 1/2008 | Dowd et al. |
| 8,356,353 | B2 | 1/2013 | Futoransky et al. |
| 8,413,237 | B2 | 4/2013 | O'Rourke et al. |
| 8,671,224 | B2 | 3/2014 | Bell et al. |
| 2003/0014669 | A1* | 1/2003 | Caceres ............. H04L 63/1433 726/25 |

(Continued)

OTHER PUBLICATIONS

Sheyner, Oleg et al., (2002) "Automated Generation and Analysis of Attack Graphs," IEEE Symposium on Security and Privacy; 12 pages.

*Primary Examiner* — Harunur Rashid
(74) *Attorney, Agent, or Firm* — Morrison & Foerster LLP

(57) ABSTRACT

A network attack simulation method including, at a network with a server and a plurality of computers, selecting one or more actions from a plurality of actions for operating on a first computer of the plurality of computers, transmitting instructions from the server to the first computer to execute the one or more selected actions, executing the one or more selected actions on the first computer, and generating data based on the execution of the selected actions. The method includes transmitting the data generated from the first computer to the server, identifying a target computer of the plurality of computers to access, transmitting one or more additional instructions from the server to the first computer to access the target computer using at least a portion of the data, and receiving confirmation from at least one of the first computer and the target computer that the target computer was accessed.

21 Claims, 17 Drawing Sheets

(56) References Cited

U.S. PATENT DOCUMENTS

2009/0007270 A1* 1/2009 Futoransky ......... H04L 63/1433
726/25
2009/0319249 A1* 12/2009 White ................ G09B 19/0053
703/13
2014/0280938 A1 9/2014 Kadaba et al.

* cited by examiner

| PERSISTANCE | PRIVILEGE ESCALATION | DEFENCE EVASION | CREDENTIAL ACCESS | HOST ENUMERATION |
|---|---|---|---|---|
| LEGITIMATE CREDENTIALS | | | CREDENTIAL DUMPING | ACCOUNT ENUMERATION |
| ACCESSIBILITY FEATURES | | BINARY PADDING | CREDENTIALS IN FILES | FILE SYSTEM ENUMERATION |
| ADDMONITOR | | DLL SIDE-LOADING | NETWORK SNIFFING | GROUP PERMISSION ENUMERATION |
| DLL SEARCH ORDER HIJACK | | | | |
| EDIT DEFAULT FILE HANDLERS | | DISABLING SECURITY TOOLS | USER INTERACTION | LOCAL NETWORK CONNECTION ENUMERATION |
| NEW SERVICE | | | | |
| PATH INTERCEPTION | | | | |
| SCHEDULED TASK | | FILE SYSTEM LOGICAL OFFSETS | | |
| SERVICE FILE PERMISSION WEAKNESS | | | | LOCAL NETWORKING ENUMERATION |
| | | PROCESS HOLLOWING | | |
| SHORTCUT MODIFICATION | | | | |
| BIOS | BYPASS UAC | | | OPERATING SYSTEM ENUMERATION |
| HYPERVISOR ROOTKIT | DLL INJECTION | | | |
| | EXPLOITATION OF VULNERABILITY | INDICATOR BLOCKING ON HOST | | |
| LOGON SCRIPTS | | | | |
| MASTER BOOT RECORD | | | | OWNER/USER ENUMERATION |
| | | INDICATOR REMOVAL FROM TOOLS | | |
| MOD. EXIST'G SERVICE | | | | PROCESS ENUMERATION |
| REGISTRY RUN KEYS | | INDICATOR REMOVAL FROM HOST | | SECURITY SOFTWARE ENUMERATION |
| SERV. REG. PERM. WEAKNESS | | | | |
| | | MASQUERAD-ING | | SERVICE ENUMERATION |
| WINDOWS MGMT INSTR. EVENT SUBSC. | | NTFS EXTENDED ATTRIBUTES | | WINDOW ENUMERATION |
| WINLOGON HELPER DLL | | | | |
| | | OBFUSCATED PAYLOAD | | |
| | | ROOTKIT | | |
| | | RUNDLL32 | | |
| | | SCRIPTING | | |
| | | SOFTWARE PACKING | | |

| LATERAL MOVEMENT | EXECUTION | C2 | EXFILTRATION |
|---|---|---|---|
| APPLICATION DEPLOYMENT SOFTWARE | COMMAND LINE | COMMONLY USED PORT | AUTOMATED OR SCRIPTED EXFILTRATION |
| EXPLOITATION OF VULNERABILITY | FILE ACCESS | COMM THROUGH REMOVABLE MEDIA | DATA COMPRESSED |
| LOGON SCRIPTS | POWERSHELL | | DATA ENCRYPTED |
| | PROCESS HOLLOWING | CUSTOM APPLICATION LAYER PROTOCOL | |
| PASS THE HASH | REGISTRY | | DATA SIZE LIMITS |
| | RUNDLL32 | | DATA STAGED |
| PASS THE TICKET | SCHEDULED TASK | CUSTOM ENCRYPTION CIPHER | EXFILL OVER ALTERNATE CHANNEL TO C2 NETWORK |
| PEER CONNECTIONS | SERVICE MANIPULATION | DATA OBFUSCATION | |
| REMOTE DESKTOP PROTOCOL | THIRD PARTY SOFTWARE | FALLBACK CHANNELS | EXFILL OVER OTHER NETWORK MEDIUM |
| WINDOWS MANAGEMENT INSTRUMENTATION | | MULTIBAND COMM | EXFILL OVER PHYSICAL MEDIUM |
| WINDOWS REMOTE MANAGEMENT | | MULTILAYER ENCRYPTION | |
| REMOTE SERVICES | | PEER CONNECTIONS | FROM LOCAL SYSTEM |
| REPLICATION THROUGH REMOVABLE MEDIA | | STANDARD APP LAYER PROTOCOL | FROM NETWORK RESOURCE |
| SHARED WEBROOT | | STANDARD NON-APP LAYER PROTOCOL | FROM REMOVABLE MEDIA |
| TAINT SHARED CONTENT | | | SCHEDULED TRANSFER |
| WINDOWS ADMIN SHARES | | STANDARD ENCRYPTION CIPHER | |
| | | UNCOMMONLY USED PORTS | |

FROM FIG. 9A

FIG. 9B

NETWORK ATTACK SIMULATION SYSTEMS AND METHODS

CROSS-REFERENCE TO RELATED APPLICATION

This application claims the benefit of U.S. Provisional Patent Application No. 62/186,906, filed Jun. 30, 2015, the entirety of which is incorporated herein by reference.

FIELD OF THE INVENTION

The present disclosure relates generally to computer networks and more specifically to simulating attacker activity on a computer network.

BACKGROUND OF THE INVENTION

Cyber security is a global issue of growing importance. Cyber espionage can affect technical, military, political and economic interests anywhere. Computer networks face a constantly evolving menace from cyber attacks, viruses, unauthorized probes, scans, and intrusions. Terrorists, criminals, and network hackers are more determined than ever to steal information, cause disorder and destroy networks. Additionally, these individuals have the knowledge, technical skills and determination to carry out their actions with, on many occasions, ease. Attacks are no longer direct but are increasingly sophisticated and stealthy. Therefore, focus in cyber security is increasingly based on the assumption that attackers are inside the network.

In order to protect a network against cyber attacks, the weaknesses of the network to various types of attacks should be understood. One method for discovering such weaknesses is through "Red Teaming." Red Teaming is a process by which experienced personnel act like an adversary and attempt to access and operate within a network in order to uncover potential weaknesses. Red Teaming simulates real-world attacks against a network and can identify gaps in security practices and controls that are not readily apparent from conducting standard technical tests. Red Teaming can help "Blue Teams" (experienced personnel responsible for defending a network) to determine adequacy of security measures, identify security deficiencies, predict effectiveness of proposed security measures, and confirm adequacy of such measures after implementation. Through Red Teaming, network administrators can uncover weaknesses, implement preventive measures, and/or train personnel to identify indicators of active attacks.

Conventional Red Team testing is a labor intensive and expertise driven capability that is expensive and time-consuming to conduct. Additionally, organizations often resist Red Team exercises due to paranoia associated with unforeseen effects such as damage to the network or exposure of sensitive data. Software tools have been developed to automate detection of network vulnerabilities. However, these tools only look at the exposed face of a network to analyze initial penetration vulnerabilities and perimeter defenses.

Accordingly, there is a need for improved network attack analysis tools.

BRIEF SUMMARY OF THE INVENTION

Described herein are methods, systems, and devices for simulating cyber adversary attacks on networks for understanding and describing post-access adversary behavior.

According to some embodiments, a simulation server module may be installed on a host computer of the network and client modules may be installed on a plurality of additional host computers on the network. The server module may coordinate a simulated attack by selecting attack actions and instructing the client modules to execute the actions. The client modules receive the instructions from the server module and cause the host computer, on which they are installed, to execute the instructed actions. Data produced by executing the instructed actions is collected by the client modules and transmitted back to the server module. Based on this data, the server module can provide additional attack instructions.

In some embodiments, a simulated attack is initiated by assuming initial penetration of a first client computer in a network. In other words, the simulated attack assumes that an attacker has gained entry to the first client computer, for example, by logging in with administrator credentials. The attack then proceeds to attempt to gain access to additional client computers in the network. The data collected by the server module can indicate which computers in the network were accessed as a result of the attack and how access was accomplished. According to some embodiments, the source of access to a targeted host computer and the method of access are determined. According to some embodiments, client computers are modified during an attack simulation. The modifications can be used to improve the network, for example by developing sensors to sense for the modifications, and/or to train network administrators, for example to train them to uncover the simulated attack by detecting the modifications.

The server module may instruct the client modules to execute actions based on models of adversary tactics and techniques to enable the system to perform the same types of adversarial actions and generate the same type of data that a real cyber-attack would. According to some embodiments, an adversary's known techniques are selected to emulate that adversary's behavior within the network, which can be useful to test the configuration and security of a network against a known set of techniques.

According to some embodiments, a computer network attack simulation server system includes a network connection for connecting the server system to a plurality of computers on the computer network, one or more processors, memory, and one or more programs, wherein the one or more programs are stored in the memory and configured to be executed by the one or more processors. The one or more programs include instructions for selecting one or more actions from a plurality of actions for operating on a first computer of the plurality of computers, instructing the first computer to execute the one or more selected actions, receiving, from the first computer, data generated in response to executing the one or more selected actions on the first computer, identifying a target computer of the plurality of computers to access, instructing the first computer to access the target computer using at least a portion of the data, and receiving confirmation from at least one of the first computer and the target computer that the target computer was accessed by the first computer.

Any of these embodiments may include instructions for determining which action or actions generated the at least a portion of the data used to access the target computer.

Any of these embodiments may include instructions for selecting one or more second actions from the plurality of actions for operating on the target computer of the plurality of computers, instructing the target computer to execute the one or more selected second actions, receiving, from the target computer, second data generated in response to executing the one or more selected second actions on the target computer, identifying a second target computer of the plurality of computers to access, instructing the target computer to access the second target computer using at least a portion of the second data, and receiving confirmation from at least one of the target computer and the second target computer that the second target computer was accessed by the first computer.

In any of these embodiments the computer network may comprise the server, the first computer, and the target computer. In any of these embodiments the data may comprise information stored on the first computer. In any of these embodiments the one or more selected actions may be selected based on one or more tactics, wherein the one or more tactics include at least one of persistence, privilege escalation, credential access, host enumeration, defense evasion, lateral movement, execution, command and control, and exfiltration. In any of these embodiments the computer network may be a production computer network.

Any of these embodiments may include instructions for, prior to selecting one or more actions from a plurality of actions for operating on a first computer of the plurality of computers, detecting a configuration of at least a portion of the computer network by communicating with the plurality of computers.

According to some embodiments, a computer network attack simulation server method includes selecting one or more actions from a plurality of actions for operating on a first computer of a plurality of computers connected to a computer network, instructing the first computer to execute the one or more selected actions, receiving, from the first computer, data generated in response to executing the one or more selected actions on the first computer, identifying a target computer of the plurality of computers to access, instructing the first computer to access the target computer using at least a portion of the data, and receiving confirmation from at least one of the first computer and the target computer that the target computer was accessed by the first computer.

Any of these embodiments may include determining which action or actions generated the at least a portion of the data used to access the target computer.

Any of these embodiment may include selecting one or more second actions from the plurality of actions for operating on the target computer of the plurality of computers, instructing the target computer to execute the one or more selected second actions, receiving, from the target computer, second data generated in response to executing the one or more selected second actions on the target computer, identifying a second target computer of the plurality of computers to access, instructing the target computer to access the second target computer using at least a portion of the second data, and receiving confirmation from at least one of the target computer and the second target computer that the second target computer was accessed by the first computer.

In any of these embodiments, the computer network may include a server that instructs the first computer and the target computer, the first computer, and the target computer. In any of these embodiments, the data may include information stored on the first computer.

In any of these embodiments, the one or more selected actions may be selected based on one or more tactics, wherein the one or more tactics include at least one of persistence, privilege escalation, credential access, host enumeration, defense evasion, lateral movement, execution, command and control, and exfiltration. In any of these embodiments, the computer network may be a production computer network.

Any of these embodiments may further include, prior to selecting one or more actions from a plurality of actions for operating on a first computer of the plurality of computers, detecting a configuration of at least a portion of the computer network by communicating with the plurality of computers.

According to some embodiments, a non-transitory computer readable storage medium includes one or more programs, which when executed by a computer network attack simulation server, cause the server to select one or more actions from a plurality of actions for operating on a first computer of a plurality of computers connected to a computer network, instruct the first computer to execute the one or more selected actions, receive, from the first computer, data generated in response to executing the one or more selected actions on the first computer, identify a target computer of the plurality of computers to access, instruct the first computer to access the target computer using at least a portion of the data, and receive confirmation from at least one of the first computer and the target computer that the target computer was accessed by the first computer.

In any of these embodiments, the one or more programs may cause the server to determine which action or actions generated the at least a portion of the data used to access the target computer. In any of these embodiments, the one or more programs may cause the server to select one or more second actions from the plurality of actions for operating on the target computer of the plurality of computers, instruct the target computer to execute the one or more selected second actions, receive, from the target computer, second data generated in response to executing the one or more selected second actions on the target computer, identify a second target computer of the plurality of computers to access, instruct the target computer to access the second target computer using at least a portion of the second data, and receive confirmation from at least one of the target computer and the second target computer that the second target computer was accessed by the first computer.

In any of these embodiments, the computer network may include the server, the first computer, and the target computer. In any of these embodiments, the data may include information stored on the first computer.

In any of these embodiments, the one or more selected actions may be selected based on one or more tactics, wherein the one or more tactics include at least one of persistence, privilege escalation, credential access, host enumeration, defense evasion, lateral movement, execution, command and control, and exfiltration. In any of these embodiments, the computer network may be a production computer network.

In any of these embodiments, the one or more programs may cause the server to, prior to selecting one or more actions from a plurality of actions for operating on a first computer of the plurality of computers, detect a configuration of at least a portion of the computer network by communicating with the plurality of computers.

According to some embodiments, a computer network attack simulation system includes a server, a plurality of computers, wherein the plurality of computers comprises a first computer and a target computer, and a network connecting the server to the plurality of computers. The server includes one or more processors, memory, and one or more server programs, wherein the one or more programs are stored in the memory and configured to be executed by the one or more processors, the one or more server programs including instructions for selecting one or more actions from a plurality of actions for operating on a first computer of the plurality of computers, instructing the first computer to execute the one or more selected actions, receiving, from the first computer over the network, data generated in response to executing the one or more selected actions on the first computer, identifying a target computer of the plurality of computers to access, instructing the first computer to access the target computer using at least a portion of the data, and receiving confirmation from at least one of the first computer and the target computer that the target computer was accessed by the first computer. The first client computer includes one or more additional processors, additional memory, and one or more client programs, wherein the one or more client programs are stored in the additional memory and configured to be executed by the one or more additional processors, the one or more client programs including instructions for receiving instructions from the first computer to execute the one or more selected action, executing the selected actions and generating the data in response to execution of the selected actions, transmitting the data to the server over the network, receiving, from the server, additional instructions to access the target computer using the at least a portion of the data, and accessing the target computer using the at least a portion of the data.

In any of these embodiments, the one or more server programs may further include instructions for determining which action or actions generated the at least a portion of the data used to access the target computer.

In any of these embodiments, the one or more server programs further include instructions for selecting one or more second actions from the plurality of actions for operating on the target computer of the plurality of computers, instructing the target computer to execute the one or more selected second actions, receiving, from the target computer, second data generated in response to executing the one or more selected second actions on the target computer, identifying a second target computer of the plurality of computers to access, instructing the target computer to access the second target computer using at least a portion of the second data, and receiving confirmation from at least one of the target computer and the second target computer that the second target computer was accessed by the first computer.

In any of these embodiments, the computer network may include the server, the first computer, and the target computer. In any of these embodiments, the data may include information stored on the first computer.

In any of these embodiments, the one or more selected actions may be selected based on one or more tactics, wherein the one or more tactics include at least one of persistence, privilege escalation, credential access, host enumeration, defense evasion, lateral movement, execution, command and control, and exfiltration. In any of these embodiments, the computer network may be a production computer network.

In any of these embodiments, the one or more server programs may further include instructions for, prior to selecting one or more actions from a plurality of actions for operating on a first computer of the plurality of computers, detecting a configuration of at least a portion of the computer network by communicating with the plurality of computers.

According to some embodiments, a computer network attack simulation method includes, at a computer network with a server and a plurality of computers, selecting one or more actions from a plurality of actions for operating on a first computer of the plurality of computers, transmitting one or more instructions from the server to the first computer to execute the one or more selected actions, executing the one or more selected actions on the first computer and generating data based on the execution of the one or more selected actions, transmitting the data generated in response to executing the one or more selected actions on the first computer from the first computer to the server, identifying a target computer of the plurality of computers to access, transmitting one or more additional instructions from the server to the first computer to access the target computer using at least a portion of the data, and receiving confirmation from at least one of the first computer and the target computer that the target computer was accessed by the first computer.

Any of these embodiments may further include determining which action or actions generated the at least a portion of the data used to access the target computer.

Any of these embodiments may further include selecting one or more second actions from the plurality of actions for operating on the target computer of the plurality of computers, instructing the target computer to execute the one or more selected second actions, receiving, from the target computer, second data generated in response to executing the one or more selected second actions on the target computer, identifying a second target computer of the plurality of computers to access, instructing the target computer to access the second target computer using at least a portion of the second data, and receiving confirmation from at least one of the target computer and the second target computer that the second target computer was accessed by the first computer.

In any of these embodiments, the computer network may include the server, the first computer, and the target computer. In any of these embodiments, the data may include information stored on the first computer.

In any of these embodiments, the one or more selected actions may be selected based on one or more tactics, wherein the one or more tactics include at least one of persistence, privilege escalation, credential access, host enumeration, defense evasion, lateral movement, execution, command and control, and exfiltration. In any of these embodiments, the computer network may be a production computer network.

Any of these embodiments may further include, prior to selecting one or more actions from a plurality of actions for operating on a first computer of the plurality of computers, detecting a configuration of at least a portion of the computer network by communicating with the plurality of computers.

According to some embodiments, a computer network attack simulation method includes, at a computer network with a server and a plurality of computers, selecting one or more actions from a plurality of actions for operating on a first computer of the plurality of computers, determining at least one effect to the first computer that would be generated from executing the one or more actions on the first computer, and modifying the first computer according to the at least one effect without executing the one or more actions on the first computer.

Any of these embodiments may further include, prior to determining at least one effect to the first computer from executing the one or more actions on the first computer, determining a risk to the first computer posed by executing the one or more actions on the first computer.

In any of these embodiments, the risk may be a risk of causing a fatal system error. In any of these embodiments, the risk may be a percentage likelihood that the one or more actions will cause the fatal system error. In any of these embodiments, modification of the first computer according to the at least one effect without executing the one or more actions on the first computer may be performed in response to determining that the risk to the first computer is above a threshold value. In any of these embodiments, the server may log the modification of the first computer. In any of these embodiments, the modification of the first computer may include saving a file onto a memory of the first computer.

According to some embodiments, a computer network attack simulation server method comprises generating an attack simulation path, wherein the attack simulation path comprises a plurality of actions for operating on one or more computers of a plurality of computers, and in response to receiving an update from the one or more computers of the plurality of computers after execution of one or more actions of the plurality of actions, updating the attack simulation path based, at least in part, on the received update.

In any of these embodiments, updating the attack simulation path based, at least in part, on the received update may include changing an action in the plurality of actions from a first action to a second action, different from the first action.

In any of these embodiments, the attack simulation path may include a plurality of sequential actions. In any of these embodiments, a result of execution of a first action of the plurality of sequential actions on a computer of the one or more computers may be a precondition to execution of a sequentially adjacent action in the plurality of sequential actions.

In any of these embodiments, the attack simulation path may be generated along with a plurality of additional attack simulation paths, and the attack simulation path and the plurality of additional attack simulation paths comprise alternative paths for moving from a first computer network attack simulation state to a second computer network attack simulation state.

According to some embodiments, a computer network attack simulation server system includes a network connection for connecting the server system to a plurality of computers on the computer network, one or more processors, memory, and one or more programs. The one or more programs are stored in the memory and configured to be executed by the one or more processors, the one or more programs including instructions for generating an attack simulation path, wherein the attack simulation path comprises a plurality of actions for operating on one or more computers of a plurality of computers, and in response to receiving an update from the one or more computers of the plurality of computers after execution of one or more actions of the plurality of actions, updating the attack simulation path based, at least in part, on the received update.

In any of these embodiments, updating the attack simulation path based, at least in part, on the received update may include changing an action in the plurality of actions from a first action to a second action, different from the first action.

In any of these embodiments, the attack simulation path may include a plurality of sequential actions. In any of these embodiments, a result of execution of a first action of the plurality of sequential actions on a computer of the one or more computers may be a precondition to execution of a sequentially adjacent action in the plurality of sequential actions.

In any of these embodiments, the attack simulation path may be generated along with a plurality of additional attack simulation paths, and the attack simulation path and the plurality of additional attack simulation paths comprise alternative paths for moving from a first computer network attack simulation state to a second computer network attack simulation state.

According to some embodiments, a non-transitory computer readable storage medium comprising one or more programs, which when executed by a computer network attack simulation server, cause the server to generate an attack simulation path, wherein the attack simulation path comprises a plurality of actions for operating on one or more computers of a plurality of computers, and in response to receiving an update from the one or more computers of the plurality of computers after execution of one or more actions of the plurality of actions, update the attack simulation path based, at least in part, on the received update.

In any of these embodiments, updating the attack simulation path based, at least in part, on the received update may include changing an action in the plurality of actions from a first action to a second action, different from the first action.

In any of these embodiments, the attack simulation path may include a plurality of sequential actions. In any of these embodiments, a result of execution of a first action of the plurality of sequential actions on a computer of the one or more computers may be a precondition to execution of a sequentially adjacent action in the plurality of sequential actions.

In any of these embodiments, the attack simulation path may be generated along with a plurality of additional attack simulation paths, and the attack simulation path and the plurality of additional attack simulation paths comprise alternative paths for moving from a first computer network attack simulation state to a second computer network attack simulation state.

BRIEF DESCRIPTION OF THE DRAWINGS

FIGS. 9A and 9B illustrate an ATT&CK™ graph of tactics and techniques used by cyber adversaries while operating within a computer network according to certain embodiments;

DETAILED DESCRIPTION OF THE INVENTION

Figure 1:
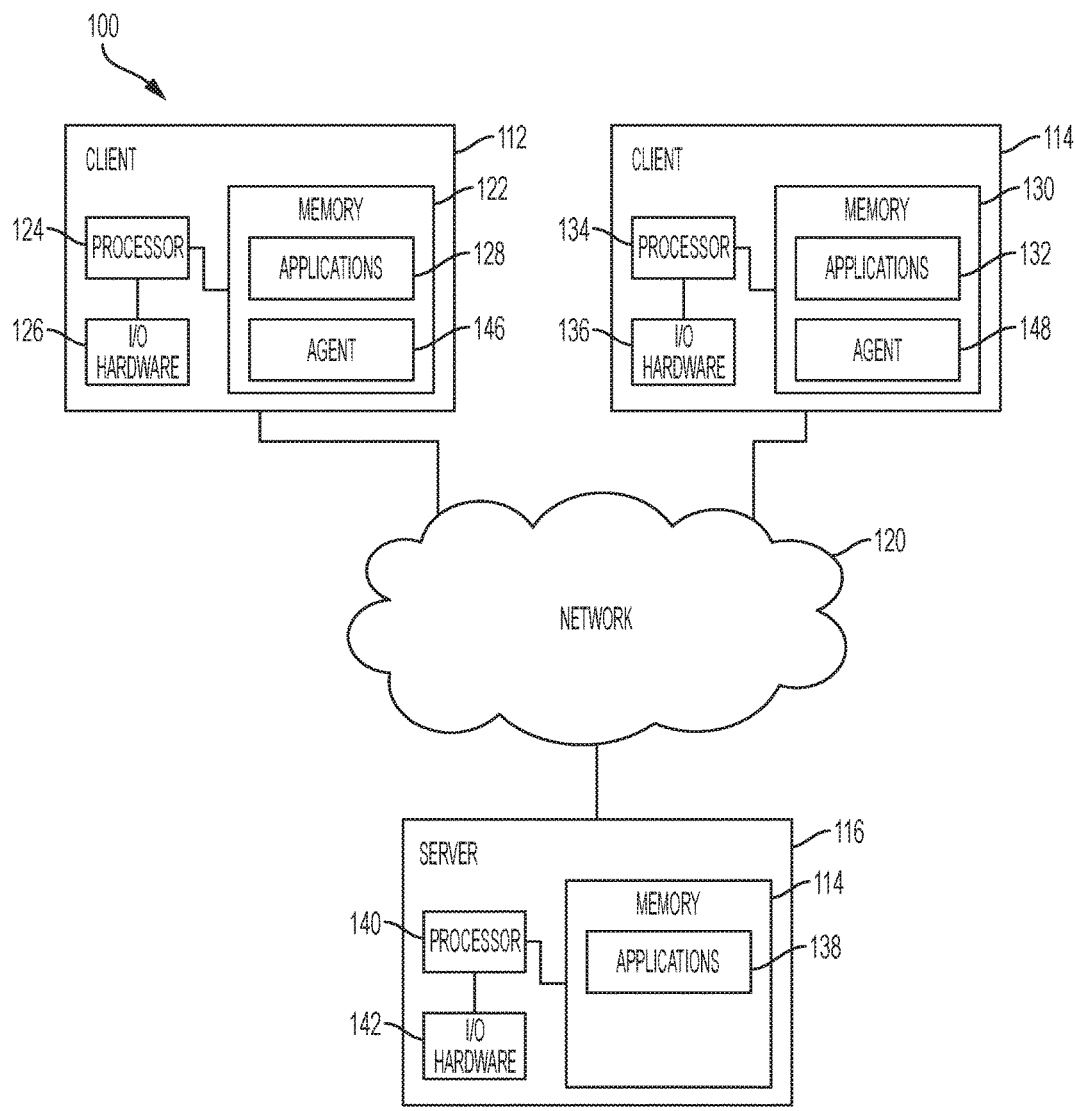
FIG. 1 is an illustration of a computer network attack simulation system according to certain embodiments.

Described herein are methods, systems, and devices for simulating cyber adversary attacks on networks to determine what network resources may include weakness to a cyber attack and how the weaknesses may be used to operate within a network. According to some embodiments, a simulation server module may be installed on a host computer of a network and client modules may be installed on a plurality of additional host computers on the network. The server module may coordinate a simulated attack by selecting attack actions and providing instructions to the client modules to execute the actions. The client modules receive the instructions from the server module and cause the host computer, on which they are installed, to execute the instructed actions. Data produced by executing the instructed actions is collected by the client module and transmitted back to the server module. Based on this data, the server module can provide additional attack actions.

The data collected during a simulation can indicate the route of attack, including the successfully accessed host computers, and the successful method(s) of attack. This data can be used to identify specific weaknesses in a network's design and use, which can be remedied before an actual adversary can take advantage of them. Methods, systems, and devices, according to described embodiments, can help organizations periodically assess their networks by viewing their environments through the eyes of an adversary without requiring an experienced Red Team or penetration test assessment. Unlike conventional penetration tests that focus on perimeter and user exploitability and conventional Red Team attacks that focus on one path to the goal, the systems described herein can allow an organization to assess a wide variety of paths that an adversary may take post-compromise.

Many conventional software tools for analyzing network vulnerabilities are inadequate to understand how to protect against an adversary once a penetration has occurred. For example, many conventional network vulnerability tools see a penetration vulnerability on machine X and no penetration vulnerability on machine Y, but do not see that the vulnerability on X will allow X to then be used to compromise Y (perhaps based on a weakness in Y). Thus, with many conventional tools, there is a gap in knowledge of the actions adversaries take after initial successful penetration of a network. Systems, methods, and devices, according to embodiments described herein, can provide automated Red Team testing of a network that focuses on behavior of a potential adversary after initial penetration. Systems, methods, and devices can enable post-penetration cyber adversary simulations to be run in production network environments. Systems, methods, and devices, according to some embodiments, can perform the same types of adversarial actions and generate the same kind of data that a real cyber attack would.

As used herein, a "network" can refer to a production computer network, an enterprise network, a simulated network, a fixed infrastructure network, a wired network, a wireless network, an ah hoc network, a peer-to-peer network, a hub-and-spoke network, or any other collection of computers with interconnected communication (whether real or simulated). For example, methods, systems, and devices, according to some embodiments, can be used within a production enterprise network to identify cyber attack weaknesses in the real, production environment. Methods, systems, and device, according to some embodiments can also be used within a simulated network in order to identify weaknesses in the simulated network, which may be useful, for example, in rapid prototyping of network configurations.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Cyber Attack Simulation System

A system for simulating a cyber-attack on a computer network is described below. The system includes a server node for managing a simulated cyber-attack and a plurality of client nodes that execute the commands of and communicate data with the server node. The server node directs an attack simulation beginning at a first client node and moving through the network to additional client nodes. The server node selects actions for the client nodes to take and collects data generated as a result of those actions from the client nodes. The server node can use the collected data to select additional actions to take in order to access additional client nodes within the network. The server node can determine the route of access from client node to client node as well as the actions that resulted in the access.

An example of a computer network attack simulation system according to some embodiments is illustrated in FIG. 1. System 100 includes a first client node 112, a second client node 114, and a server node 116 that are interconnected by communication network 120. First client node 112, second client node 114, server node 116, and communication network 120 are components of a computer network. Communication network 120 generically represents the system that nodes on the network use to communicate. Communication network 120 may include multiple devices such as switches, routers, gateways, firewalls and other networking devices. The computer network may be partitioned into multiple interconnected networked zones, such as one or more local area networks (LAN), that are interconnected via an intranet and/or via the internet. These zones may include differing levels of security, such as a low security "demilitarized" zone (DMZ) connected to a high security LAN separated by one or more firewalls. System 100 can include all the computers on the computer network or a portion of the computers on the network. System 100 can include only computers in a specific zone, a selection of computers across zones, or any other set of computers in the network.

A "client node" is a host computer connected to communication network 120 that may participate in an attack simulation. According to some embodiments, each host computer on which a simulation client module is installed and executed is a client node. A client node can include personal computers and servers connected to communication network 120. Client nodes may be connected to communication network 120 in a variety of configurations. For example, a subset of client nodes may be located in a local area network and connected to another subset of client nodes in another local area network via the internet. Client nodes can be separated from each other and/or the server node by one or more firewalls, routers, switches, etc. According to some embodiments, an operator establishes a host computer as a client node by installing one or more client modules on the host computer. According to some embodiments, the simulation system can create new client nodes by installing client modules on host computers during the running of a simulation.

Client nodes may run a variety of operating systems including a Windows operating system, a Macintosh operating system, a Linux or other Unix operating system. For example, one client node can be a laptop personal computer running the Windows 8 operating system while another client node can be a desktop personal computer running the Mac OS X operating system. One or more client nodes may be a server, such as a web server, email server, file server, or application server running a server operating system (for example, Red Hat Enterprise Linux, Windows Server, Mac OS X Server, or other server operating system).

Server node 116 is a host computer connected to communication network 120 that manages an attack simulation. Server node 116 may be a dedicated host computer used to manage an attack simulation or may be a component of a host computer connected to communication network 120. For example, server node 116 may be an administrator host computer used for production enterprise network management. Server node 116 may be a component of a server such as an email server, application server, file server, etc. According to some embodiments, server node 116 is a host computer on which a simulation server module has been installed and executed.

The first client node 112 includes a tangible computer-readable memory 122, a processor 124, and input/output (I/O) hardware 126 (that may include a display). The processor 124 executes one or more applications 128 and one or more client applications 146 that are stored in the memory 122. The second client node 114 typically is configured in substantially the same general way as the first client node 112, with a tangible computer-readable memory 130 storing one or more application 132 and one or more client applications 148, a processor 134, and input/output (I/O) hardware 136 (including a display). The server node 116 includes a tangible computer-readable memory 144, a processor 140, and input/output (I/O) hardware 142. Processor 140 executes one or more server applications 138 that are stored in the memory 144.

Communication network 120 and client nodes 112 and 114 can be components of a production enterprise network, and therefore, may include applications, databases, services, configurations, files, and other components required to operate in the ordinary course of business. As opposed to some conventional cyber-attack simulation systems that simulate a target network, system 100 can operate within an actual production network eliminating the need to recreate the production enterprise network inside a simulation.

Server node 116 directs an attack simulation on system 100 and collects data generated during the attack. Client nodes accept instructions from server node 116, execute those instructions, and transmit data generated by executing the instructions back to server node 116. According to some embodiments, server node 116 selects first client node 112 as the launching point for an attack by assuming that client node 112 has been penetrated by an attacker. For example, server node 116 can assume that an attacker has obtained administrator credentials for client node 112. Starting at client node 112, server node 116 directs a simulated attack on the network. For example, server node 116 may direct a simulated attack to gain access to as many client nodes on the network as possible.

Server node 116 selects one or more actions for a client node to execute in order to achieve a simulation goal. For example, according to some embodiments, the goal is to access as many client nodes on the network as possible, and server node 116 selects one or more actions to obtain information or execute processes that facilitate access to other client nodes on the network. According to other embodiments, the goal is to obtain information stored in a specific client node of the network such as a file server, and server node 116 selects one or more actions to obtain access to the specific client node to exfiltrate the information.

Client nodes 112 and 114 accept instructions from server node 116 and execute instructed actions. For example, client node 112 may receive an instruction to execute a command line instruction (e.g., on many operating system platforms, the command line instruction "dir" will produce a listing of the contents of a location in the client node's file directory) or to install and execute one or more applications that an adversary may execute. Client node 112 executes the actions according to the received instructions. Client node 112 can transmit data generated in response to executing the received instructions to server node 116. For example, according to some embodiments, an executed instruction results in the output of credentials stored on client node 112 and client node 112 transmits those credentials to server node 116.

Server node 116 can maintain records of the instructions sent to client nodes and the data received from client nodes. Server node 116 can use the received data to select additional actions for client nodes to execute. For example, according to some embodiments, client node 112 generates an output of stored credentials in response to execution of an instruction and transmits those credentials to server node 116. Server node 116 can analyze those credentials and instruct client node 112 to use those credentials to attempt to access client node 114. In response to receiving the instructions, client node 112 can attempt to access (e.g., log into) client node 114 using one or more of the credentials. A successful login is reported to server node 116, which associates the credentials with the successful login so that a later analysis can recognize that the credential on client node 112 was obtained and used to access client node 114.

According to some embodiments, the simulation system can include as client computers host computers connected to the network that are running a client module. According to some embodiments, server node 116 can automatically detect all client computers connected to the network, without requiring an operator to provide configuration information, by communicating with the client computers through the client module. For example, at start-up of an attack simulation, server node 116 may communicate with one or more client node to gather information such as node location (e.g., network address), node operating system, etc.

Conducting a simulated attack on a production network, according to some embodiments, results in modifications to the client nodes that participate in the simulation. For example, the execution of one or more actions may result in a modification to the client node. For example, modifications may be a file saved to memory, modification of an existing file, and modification of a parameter. Modifications of client nodes, according to some embodiments, can be used to improve network defenses and train network administrators (and/or Blue Teams). For example, sensors (e.g., Intrusion Detection Sensors) can be developed that can detect one or more modifications to one or more client nodes. During network operation, an alarm by one or more sensors could indicate that an adversary is operating within the network. Network administrators can train by searching for the modifications to ensure that they can detect that an adversary is or has been operating within the network and to help the administrators to develop new tools to defend against such attacks.

According to some embodiments, the simulation system maintains a record of modifications to network nodes resulting from execution of a simulation. Modification may include changes to registry values, installation of programs, additions or deletions of data from a file stored on a client computer, or other changes to a client computer caused by executing an instructed action. During a simulation, the simulation system can add to this record with the data received from client computers and the associated instructed actions. This can ensure that the network can be returned to its pre-simulation state, which is important for simulations executed on production enterprise networks.

According to some embodiments, one or more actions may be identified by the simulation system and the simulation system may determine that one or more client computers should not be instructed to execute the one or more actions. When such a determination is made, the simulation system can simulate the execution of the action or actions by determining what the likely results of the action or actions would have been had they been executed and effecting the results without instructing client computers to execute the action or actions. For example, where one or more actions represent the installation and execution of a key-logger on a client computer that could be used to capture user keystrokes to extract user credentials, the system may determine that eventually the key-logger would successfully obtain a given user credential, but the system does not want to execute the actions (for example, because there are no users, there are no users operating during the simulation, or it would take too long), the system can simulate the execution of the key-logger actions by saving the given user credential in the memory of the client computer.

According to some embodiments, one or more actions selected by the simulation system may pose a risk to a production enterprise network. For example, one or more actions may have potential to cause a significant fault, such as blue screening or file corruption, in one or more client computer. Because such a fault would be undesirable for a production enterprise network, some embodiments of the simulation system make a determination that the selected action or actions are too risky to execute on the network. For example, where a selected action is to install and run a piece of exploit software that installs a service that is executed at start-up, and the exploit software is known to have the potential to crash a client computer, instead of instructing the client computer to execute the action or actions, the server node may determine that the execution of the exploit would have been successful (for example, based on the operating system and security features of the client node) and instruct the client node to install the service. In this way, the effects of an adversary action can be achieved without risking damage to the network.

According to some embodiments, the simulation server can determine whether a given action or actions would pose a risk to the client computer and modifies the client computer (e.g., deposits an artifact or artifacts on the client computer) if the risk is determined to be too high. The modification is effected without executing the action or actions on the client computer. According to some embodiments, the risk is a percentage likelihood that execution of the action or actions will cause an undesired effect to the client computer. According to some embodiments a risk may be determined to be too high if it is above a certain threshold value (e.g., anything above zero, above 25%, above 50%, etc.). Undesired effects can include, for example, a fatal system error, data corruption, and data exfiltration. According to some embodiments, undesired effects can be defined and/or customized by a network administrator.

According to some embodiments, modifications of a client computer that would have occurred had the client computer executed a risky action or actions can be deposited on the client computer as an "artifact." Network administrators (and/or Blue Teams) can then train by attempting to uncover the (simulated) adversary behavior by attempting to find these artifacts. Artifacts can be used to develop sensors that can detect adversary action by sensing the artifacts. Example of artifacts, according to some embodiments, include files stored in the memory of a client computer, modifications to existing files in memory, modifications of running applications, execution of new applications, modifications to existing system parameters such as registry keys, etc.

According to some embodiments, the server node logs the depositing of artifacts on a client computer. This can enable the client computer to be "rolled back" to its pre-simulation state and can facilitate training of network administrators by providing information on how (what action or actions were selected) and when artifacts were deposited during an attack simulation.

Cyber Attack Simulation Server System

Figure 2:
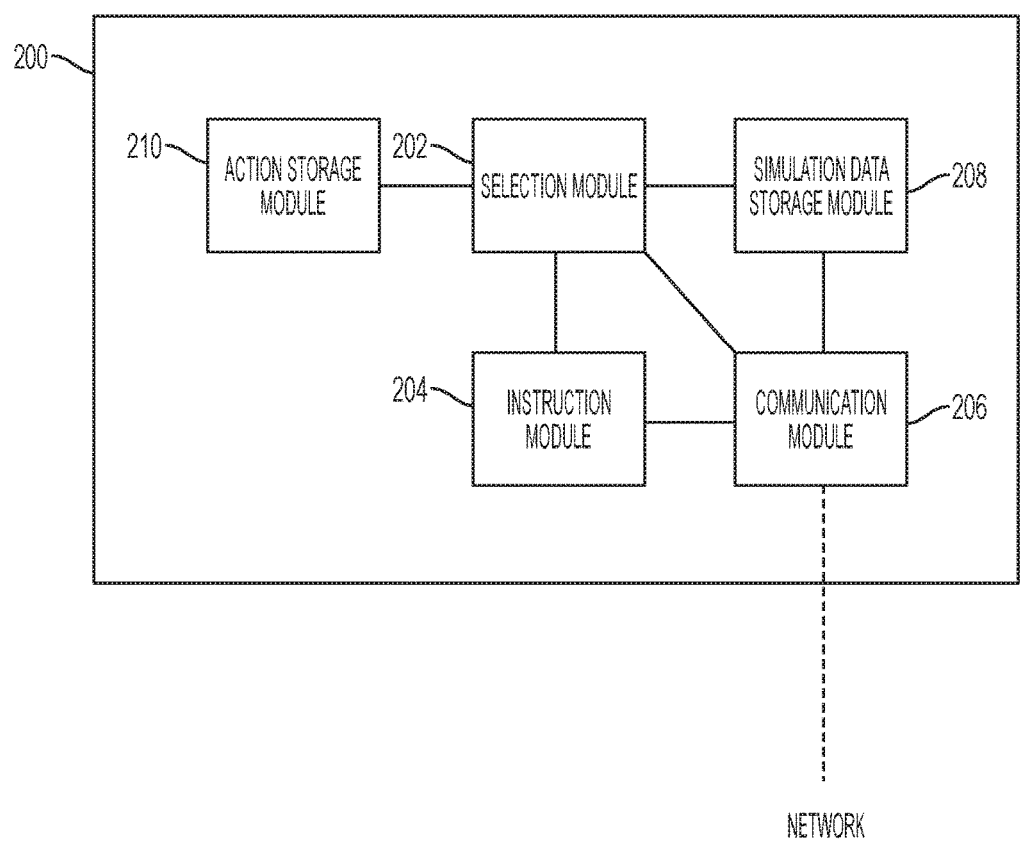
FIG. 2 is an illustration of a computer network attack simulation server system according to certain embodiments.

FIG. 2 is a functional diagram of server system 200 for directing a simulated cyber attack on a network in accordance with some embodiments. Server system 200 may be a component of a system for simulating a cyber attack on a network (e.g., system 100, FIG. 1) and can be connected to one or more computers via a communication network. Server system 200 includes selection module 202, instruction module 204, communication module 206, simulation data storage module 208, and action storage module 210. These modules can be components of one or more programs stored in a memory of server system 200 that can be executed by one or more processors of server system 200.

Selection module 202 selects one or more actions for one or more client computers to execute during a simulated cyber attack. Selection module 202 can make the selection based on a simulation goal and/or on data received from client computers during the simulation. According to some embodiments, a goal may be an input to selection module 202 that may be set by an operator (for example, through a graphical user interface) prior to initiating an attack simulation. According to some embodiments, multiple goals are defined in server system 200 and server system 200 executes a simulation based on each of the multiple goals. An example of a goal, according to some embodiments, is to access as many client computers on the network as possible. Another goal can be to access a specific client computer, such as a file or email server.

Action storage module 210 stores actions that comprise known cyber attack techniques used by adversaries to operate within a production enterprise network. For example, the actions may be based on the Adversarial Tactics, Techniques, and Common Knowledge (ATT&CK™) model and framework developed by The MITRE Corporation, which describes the actions an adversary may take while operating within an enterprise network. The model details the post-initial access (post exploit and implant) tactics, techniques, and procedures (TTP) that advanced persistent threats (APT) use to execute their objectives while operating inside a network.

An example of a cyber attack technique that may be incorporated into one or more actions stored in action storage module 210, according to some embodiments, is the credential dumping technique that is used to obtain information from weaknesses in operating systems or software that can be used to log into an operating system. Utilities can dump credentials in many different ways including: extracting credential hashes for off-line cracking, extracting plain-text passwords, or finding Kerberos tickets. Examples of credential dumping utilities include: pwdump7, Windows Credential Editor, Mimikatz, and gsecdump. Action storage module 210 may include one or more credential dumping utilities as well as information about the type of platform a given utility may be used with.

Another example of cyber attack techniques that may be incorporated into one or more actions stored in action storage module 210, according to some embodiments, are account enumeration techniques, which cyber adversaries may use to get a listing of all local or domain accounts and their permissions. Example commands which can acquire this information on Windows operating systems are: "net user" and "dsquery." Selection module 202 may decide to instruct a client computer running the Windows 8 operating system to obtain a listing of domain accounts and permissions, and may query action storage module 210 and select the "net query" command.

According to some embodiments, selection module 202 selects one or more actions from action storage module 210 based on an attack simulation goal and the stage of the attack. For example, at the initiation of an attack, selection module may select a credential dumping action for the platform of an initial client computer (e.g., client 112 in FIG. 1) from which the attack is launched. After the server system instructs the initial client computer to execute the one or more credential dumping instructions, selection module 202 may select one or more account enumeration actions to determine what other client computers may be accessed from the first client computer. After the server system receives the account information generated from the first client computer, the server system may then choose an action from action storage module 210 for accessing another client computer based on the account information with the credentials gained from the credential dumping action.

Once selection module 202 selects one or more actions for execution by one or more client computers, instruction module 204 generates instructions for executing on a client computer. According to some embodiments, actions stored in action storage module 210 that are selected by selection module 202 are encoded at a high level. Instruction module 204 may transform the high level action into lower level commands or scripts tailored to the particular computing platform of the client computer.

Communication module 206 establishes and maintains communication connections with client computers over the network to which server system 200 is connected. Through these established communication channels, communication module 206 transmits instructions from instruction module 204 to client computers and receives data from client computers. Communication module 206 can transmit received data to selection module 204 and simulation data storage module 208. According to some embodiments, communication module 206 establishes encrypted communication channels with client computers.

Simulation storage module 208 stores information about a simulated attack, including instructions sent to client computers and data received from client computers. The information stored in simulation storage module 208 can be used to analyze a simulated attack to determine, for example, the path of access from the initial client computer to one or more target client computers and the actions taken along that path. This information can be used to identify weaknesses in the security of a network and to train network administrators on how to respond to an attack.

Cyber Attack Simulation Client System

Figure 3:
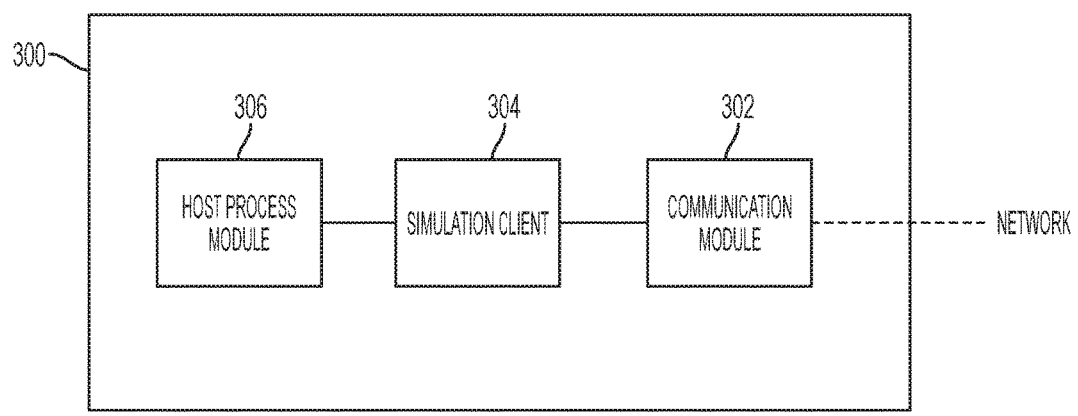
FIG. 3 is an illustration of a computer network attack simulation client system according to certain embodiments.

FIG. 3 is a functional diagram of client system 300 for executing actions of a simulated cyber attack in accordance with some embodiments. Client system 300 may be a component of a system for simulating a cyber attack on a network (e.g., system 300, FIG. 1) and can be connected to one or more computers via a communication network. Client system 300 can be a production host computer onto which simulation system components (such as a simulation client module or modules) have been installed. Client system 300 includes communication module 302, simulation client module 304, and general processing module 306.

General process module 306 can include the production processes executed by the host computer during the ordinary course of business. These are the native processes, services, applications, etc., that can be executed by the host computer during normal operation.

Communication module 302 establishes and maintains communication connections with a simulation server (for example, server system 200) over the network. Through these established communication channels, communication module 302 receives instructions from the server and transmits data to the server. According to some embodiments, communication module 302 establishes and maintains an encrypted communication channel with the server. Communication module 302 can also establish and maintain communication with other client computers on the network, according to some embodiments.

Simulation client module 304 manages the execution of instructions received by client system 300 from a simulation server. Simulation client module 304 provides commands to general processing module 306 to execute the instructed actions. Simulation client module 304 also collects data generated as a result of the execution of instructed actions. For example, according to some embodiments, simulation client module 304 provides a command to general processing module 306 to change a registry value. In response to execution of that command, simulation client module 304 tracks the change in the registry value—i.e., the original value and the new value. Simulation client module 304 sends collected data to the simulation server through communication module 302.

Cyber Attack Simulation Method

Figure 4:
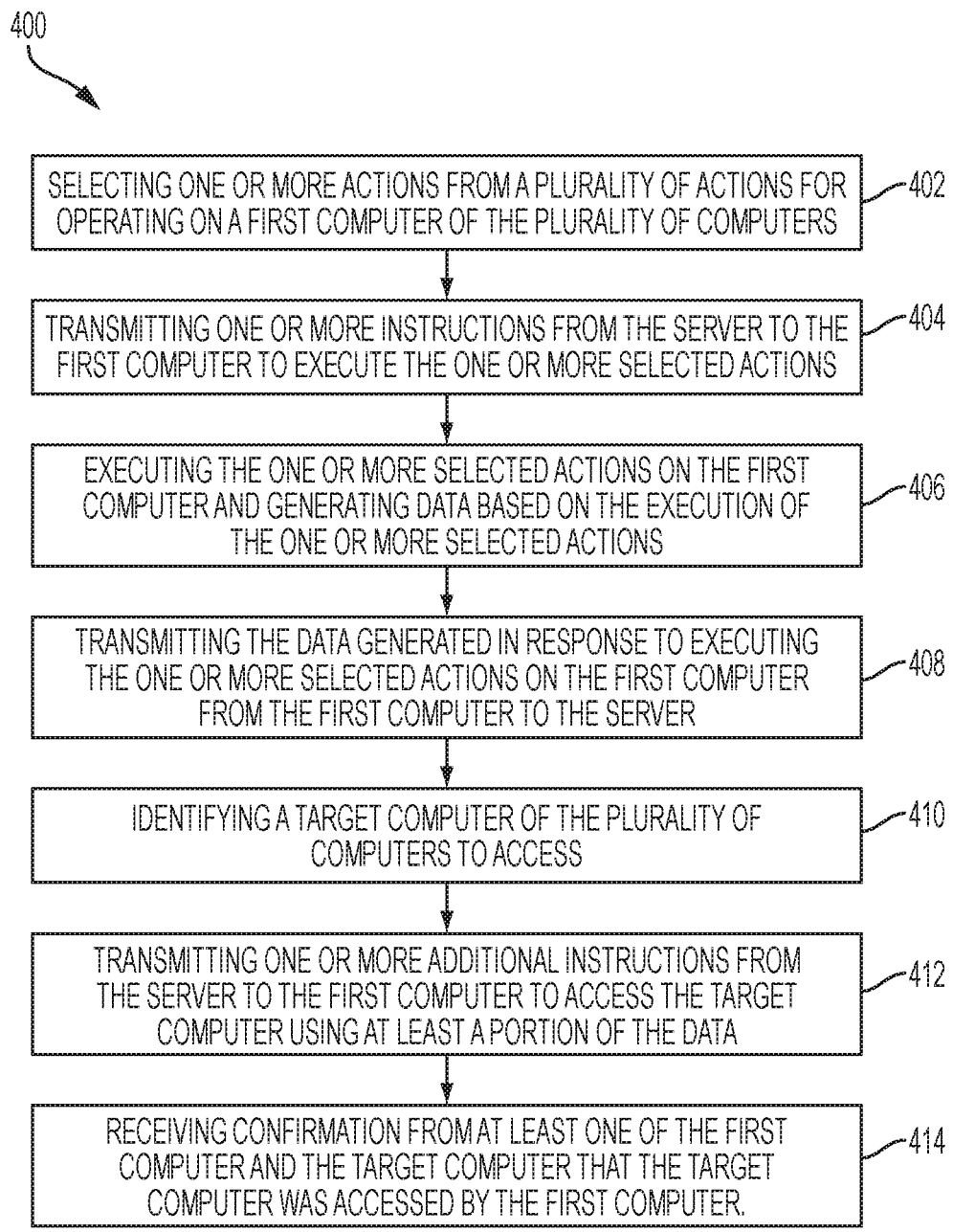
FIG. 4 is flow diagram of a computer network attack simulation method according to certain embodiments.

FIG. 4 is a flow diagram illustrating method 400 for simulating a cyber attack on a network in accordance with some embodiments. Method 400 is performed by a system (e.g., system 100, FIG. 1) with a server, a plurality of computers, and a communication network connecting the server and the plurality of computers. The plurality of computers can include host computers connected to the network. One or more of the computers in the plurality of computers may be configured to operate an attack simulation client application (for example, client node 112 or 114 in FIG. 1). Some operations in method 400 may be combined and/or the order of some operations may be changed.

At step 402, one or more actions of a plurality of actions for operating on a first computer of the plurality of computers are selected by the server. According to some embodiments, the plurality of actions is stored in the server. The plurality of actions simulates actions that a cyber adversary may take while operating inside a production enterprise network. According to some embodiments, the selection is based on a simulation goal, such as to access as many computers on the network as possible or to access a specific computer (such as a file or email server) and access sensitive data. According to some embodiments, the goal is pre-defined while in other embodiments, the goal may be selected by a simulation administrator (for example, through a graphical user interface). According to some embodiments, the selection can be based on data received from one or more client computers. According to some embodiments, the selection is based on configuration data received from a client computer (such as, for example, operating system, configuration parameters, running services, security features, etc.). According to some embodiments, the selection is based on data received from a client computer in response to execution of a previous instruction. For example, the server may have previously instructed a client computer to conduct a credential dump resulting in the server receiving the credentials stored on the client computer, and the server may select an action to take using those credentials, such as to log into another computer on the network using the credentials.

The first computer can be a computer of the plurality of computers that is the focus of the simulation at a given point during the simulation. According to some embodiments, the first computer is the initial computer used in the simulation. In other words, a simulation begins by instructing the first computer to execute one or more actions and the simulation can continue by moving from the first computer to another computer (a target computer) of the plurality of computers.

At step 404, one or more instructions are transmitted from the server to the first computer to execute the one or more selected actions. For example, according to some embodiments, one or more instructions may be to execute a command-line instruction (for example, to gather information about the contents and configuration of the first computer), to execute an action that results in execution of an application on the first computer, or to execute an action to modify an existing service on or configuration of the first computer.

At step 406 the first computer executes the one or more selected actions, which results in the generation of data based on the execution of the one or more selected actions. Data can includes information about the results of the execution of the one or more selected actions. For example, where an action is a credential dump, the data generated can include the stored credentials. Generated data can also include the output resulting in the execution of a command, such as the listing of a file directory in response to execution of the command-line command "dir." Other examples of generated data can include changes to configurations, programs, or files on the first computer.

At step 408, the data generated in response to executing the one or more selected actions on the first computer is transmitted from the first computer to the server. According to some embodiments, the data is transmitted over an encrypted communication channel established between the first computer and the server.

At step 410, the server identifies a target computer of the plurality of computers to access. The target computer can be any computer that is an object of a simulation at a given stage of the simulation. For example, where the simulation is operating within a first computer and decides to begin operating in a second computer, the second computer is a "target computer." The server may identify the target computer in several ways. For example, the server may know of all computers directly reachable from the first computer (e.g., all those within the same domain) and may select one or more of the computers for the first computer to attempt to access. According to some embodiments, the server may select one or more of the computers based, in part, on whether the one or more computers include a simulation client module. In this way, for simulations that do not include all host nodes on a network, the simulation will not spread beyond the nodes intended to be included in the simulation (where intended nodes are those nodes on which a client module is installed and executed).

At step 412, the server instructs the first computer to access the target computer using at least a portion of the data. For example, the server may instruct the first computer to log into the target computer using credentials stored on the first computer.

At step 414, the server receives confirmation from at least one of the first computer and the target computer that the target computer was accessed by the first computer. This confirmation enables the server to direct the next progression of the attack simulation (such as accessing data on the target computer or accessing another target computer).

An example of steps 408 through 414, according to some embodiments, may include the server instructing the first computer to execute standard information gathering actions to generate information about processes and services being run on the target computer, the versions for these processes and services. Based on this information, the server may determine which of these services is vulnerable in order to use the vulnerability to cause the first computer to install a remote agent on the target computer.

Once the server has identified a potential vulnerability, the server can instruct the client computer to send an exploit targeting the vulnerability to the target computer. Depending on the state of the target computer, the exploit may be successful or not. If the exploit is successful, the server can receive confirmation from the client computer and/or from the target computer that a remote agent was installed in the target computer.

According to some embodiments, the execution of an attack simulation may be preceded by an initialization process whereby the server determined the configuration of the network, including the host computers on the network. According to some embodiments, the configuration is determined by communications between the server and the client computers. In this way, the detection of the configuration of the network is automatic and does not require an operator to define a configuration.

According to some embodiments, during the initial stage of an attack simulation actions are selected by the simulation server and executed by an initial client computer to gather information about a first target client computer. For example, the initial client computer may execute a port scanner that analyzes the ports of the first target client and determines all of the services that are being run, such as an Internet Web server, an email server, a finger service, or other services. Further information might be acquired by running actions designed to exploit the services identified by the port scanner. For example, if the first target client is running a finger service, then that service will be targeted by an action to determine software version, user names, and other characteristics of the first target host. As a further example of an information gathering action, a network discovery action may be used to determine the number of hosts in the target network and the Internet Protocol (IP) address of each host.

Following execution of the information gathering actions, the initial client computer executes actions to obtain access to the first target client based on the information that has been retrieved. For example, information may be obtained regarding a firewall operating system being run on the first target client, such as the software brand and revision number. Based on this information, the server may select an action that can take advantage of security vulnerabilities for that particular firewall, where the action is stored in the server (e.g., in action storage module 210, FIG. 2) and instruct the initial client computer to execute the action on the first target client.

According to some embodiments, once the first target client has been accessed, the initial client computer can install a remote access tool on the first target client that can operate on the first target client to perform a number of functions, such as receiving and executing control commands and actions from the first client computer and sending back information to the first client computer. According to some embodiments, once the remote access tool has been installed on the first target client, the remote access tool can be used by the first client computer to gain access to other client computers that make up the network, such as a second target client computer. For example, the remote agent on the first target client can execute actions, such as those discussed above, to gather information and take advantage of weaknesses in the second target client. To clients connected to the network, such commands or queries appear to originate from the first target client.

According to some embodiments, operation within the network may continue until all of the target hosts have been accessed and/or until the goal of the simulation testing has been achieved (e.g., access to a specific host such as a file or email server or installation of programs on hosts).

The term "exploit," as used herein, is a broad concept that includes any means for gaining access to and/or obtaining information from a client computer. The concept includes, without limitation, the execution of actions that are designed to take advantage of specific security weaknesses that have been identified in a client computer. For example, a client computer may have been misconfigured in a manner that is detectable and allows installation of a remote agent. This concept also includes, without limitation, the execution of information gathering actions, such as port scanners and network discovery actions. This concept further includes, without limitation, the exploitation of security vulnerabilities of a client computer that result from the compromise of other client computers. For example, once a remote agent has been installed in the first target client, it may be possible to gather information and install remote agents on other target clients due to hierarchies of trust within the network.

This concept further includes, without limitation, obtaining access to a client computer by virtue of a lack of security features or measures.

According to some embodiments, an attack simulation method can be automated. Actions can be selected for execution on one or more client computers independently of user interaction. The selection process may be based on adversary attack profiles, which are known patterns of operating within an accessed network. The selection process may also utilize one or more attack graphs that describe a series of actions an adversary may take for a given computing platform. In contrast to some conventional adversary attack simulation methods that rely on static attack graphs and merely determine whether a given environment is vulnerable to the fixed progression represented in an attack graph, the method according to some embodiments can update an attack graph or choose another attack graph based on data received from client computers. Since the data received can be from production processes executed on production nodes of the network, the method can more closely mimic the actions a real adversary is likely to take in a production enterprise network.

Simulation Language

An attack simulation system, according to some embodiments, can orchestrate an attack simulation using an attack simulation language defining actions and parameters that can represent tactics, techniques, procedures, and adversaries that may be simulated during an attack. The simulation language can describe the specific actions that may be executed by nodes (e.g., client computers) in a network, the preconditions for the actions, the results of the actions, and the relationship among the actions (e.g., the ordering of actions). The simulation language can also include representations of adversaries, for example, by specifying the action(s) a particular adversary might take and/or the specific way an adversary might use an action. According to some embodiments, an adversary can be simulated by building an adversary profile that can include a list of actions the adversary has been known to use, the way and order they use them, as well as other considerations regarding adversary behavior.

Different adversaries have different high level goals, such as exfiltrating data on a specific location(s) of a network or install logic on all systems in a network in preparation for a disk wiper attack. Such high levels goals can be broken down into sub-goals, using the simulation language. For example, sub-goals could include gaining certain privileged user credentials, establishing persistence, host enumeration, etc.

According to some embodiments, the simulation language can represent high level tactics, techniques, and procedures as combinations of low level actions and the associated preconditions and post-conditions of executing the actions. Preconditions can be the list of conditions that must be met for the action to succeed and post conditions can include both side effects of the action and the desired result of the action (e.g., the goal of the action). According to some embodiments, the simulation language can represent an overall objective of an adversary, for example, to obtain a specific type of information or to cause some specific effect within the network. The simulation language can be used to define individual actions that could represent how the adversary would achieve the given objective. The simulation language could be used to chain specific actions together to achieve whatever goal is defined.

According to some embodiments, the simulation language is structured to represent tactics, techniques, and procedures in a layered stack model that represents pre and post conditions of a system within a network (e.g., a client computer) that executes a given tactic, technique, or procedure. This can enable identification of system-level adversary operation within a network. According to some embodiments, modeling tactics, techniques, and procedures as a stack enables determination of the best level within a system to sense for data generated by the execution of an action as well as enabling identification of, for example, kernel and user application program interfaces (API) per tactic, technique, or procedure.

Figure 11:
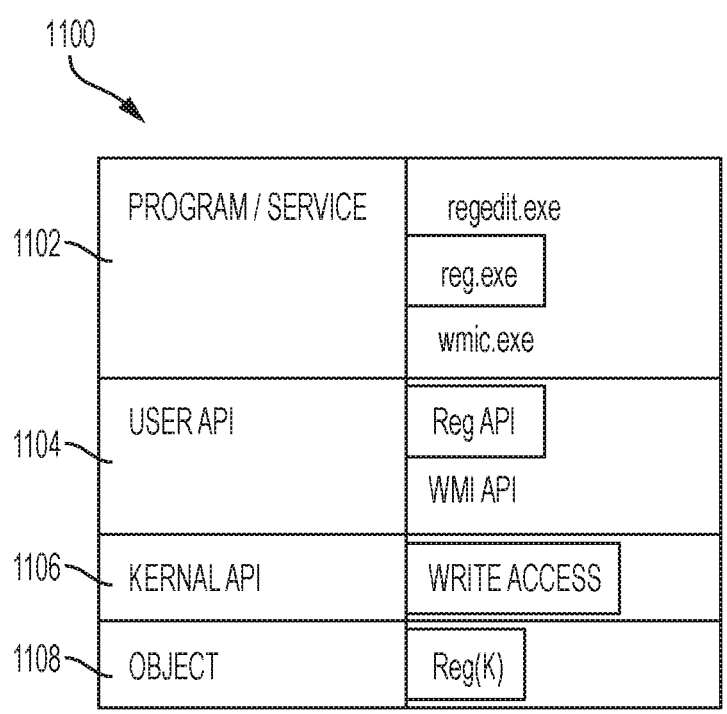
FIG. 11 is an illustration of a layered stack model for a tactic of service persistence, according to certain embodiments.

An example of a layered stack model for a tactic of service persistence, according to some embodiments, is shown in FIG. 11. Stack 1100 includes Program/Service layer 1102, user API layer 1104, Kernel API layer 1106, and Object layer 1108. The simulation language can specify that an adversary established service persistence by writing a registry key "K" ("Reg(K)") using the "reg.exe" program/service which in turn used the user space API "Reg API" and passed through the kernel space write access and token checks. According to some embodiments, the simulation language includes parameters representing the pre-conditions for the technique illustrated in FIG. 11 as requiring the necessary user permissions to run reg.exe and to write a file and parameters representing the post conditions as a new registry key created and persistence established.

Other programs/services 1102 that could be used to achieve service persistence in the example of FIG. 11 are "regedit.exe" and "wmic.exe." Another user API 1104 is "WMI API." A particular set of actions can represent an adversary. For example, one adversary may generally use reg.exe to write a registry key, while another adversary may generally use regedit.exe to write a registry key.

Attack Simulation Engine

According to some embodiments, an attack simulation system includes a logic engine that generates one or more chains of planned attack simulation actions that may be taken by one or more host computers in a network during an attack simulation. For example, in the server simulation system of FIG. 200, a logic engine may be a component of a module (e.g., selection module 202 or action storage module 210) or may be an additional module. Logic engine may communicate with one or more of selection module 202, action storage module 210, instruction module 204, simulation data storage module 208, and/or communication module 206. The system can select one or more actions for host computers to execute based on the planned one or more chains of attack simulation actions generated by the logic engine. According to some embodiments, the logic engine uses the simulation language to construct planned attack simulation action chains.

A logic engine can take as inputs the network state, host state, and adversary knowledge, and output one or more possible paths of movement through a network in the form of chains of adversary actions that can be performed during an attack simulation in a forward chaining fashion. Some embodiments can prioritize one or more paths based on an adversary profile. For example, where the logic engine generates a path that includes a chain of actions that an adversary is known to take, that path can be prioritized over other paths during a simulated attack.

The network state and host state can include information such as what user is logged in to a host, what hosts are online, what services, applications, etc. are running on a host, host configurations, etc. Adversary knowledge can include the access an adversary has, what computers the adversary knows are in the network that can be accessed, anything an adversary has done in the network so far (for example, where an attack is simulated beginning at an advanced stage or where the logic engine generates new paths based on new information or changed information).

According to some embodiments, the inputs to the logic engine can include knowledge of a single host computer and a single user of the host computer. According to some embodiments, the inputs can include extensive information (e.g., running programs/service, all accounts, all connected host computers, etc.) about each host computer in a network. Generally, the inputs to the logic engine originate with a client in the network. For example, at the initiation of an attack simulation, host computers running an attack simulation client may communicate information about the host to the attack simulation server. This information can be used as input to the logic engine to generate predicted attack paths.

According to some embodiments, the logic engine encodes potential actions with preconditions and postconditions. Preconditions specify the logical facts about the target system that must hold true for the action to be executed successfully, while postconditions specify logical facts that will be true after successfully executing the action. For example, a first act ("act1") can be represented with preconditions P and Q, which must hold true for act1 to be successfully executed (e.g., successfully executed on a host), and with postconditions R, S, and ~P (not P), which will be true after act1 is successfully executed. Following this scheme, second and third actions can be represented such that a set of actions includes:

Action act1: preconditions: P, Q, postconditions: R, S, ~P

Action act2: preconditions: ~P, R, ~S, postconditions: T, ~U

Action act3: preconditions: Q, postconditions: ~S, U

The logic engine may generate and maintain a model of the target network or portions of the target network that the engine uses to determine which action or actions to select. Following the above example, the logic engine may "know" (based on the model) that the current state of the target system includes that conditions P, Q, and S are currently true. Thus, the current state can be represented in the logic engine as <P, Q, S>. The logic engine can use the current state to determine which action or actions to select for a host computer or host computers to execute. For example, given the three above defined actions, the logic engine could select act1 for a host computer to execute, since the preconditions for act1 (P and Q) are both currently true based on the current state <P,Q,S>.

For the logic engine to select from among various actions that may be available to the logic engine, the logic engine may encode a goal for the simulated attack of the target network. The goal may be encoded by the logic engine as a state of the network that the attack simulation system would like to reach. The goal state can be represented by a set of conditions. For example, the goal may include that conditions T and U are true, and the goal state is represented by the logic engine as <T,U>.

Once the current state and the goal state of the target network are formulated, the logic engine can determine a chain of actions that can be executed by hosts on the network to get from the current state to the goal state. Continuing the above examples, the logic engine can determine that to get from current state <P,Q,S> to goal state <T,U>, the following actions should be performed in the following order: act1→act3→act2→act3. Based on this determined path or chain of actions, the attack simulation server can transmit instructions to one or more host computers to execute one or more actions. For example, the server can successively send instructions to a host to execute act1, act3, act2, and then act3 again. In some embodiments, each time the host computer executes an act, the host computer sends back to the attack server the results of the act. The logic engine may then update its internal model and check whether the predicted postconditions of the executed act are true. If so, the logic engine may select the next act from the chain of actions. If the postconditions of the act are not as predicted, the logic engine may update its internal model accordingly and develop a new chain of actions to get from the updated state to the goal state.

According to some embodiments, the logic engine can simulate a specific adversary by limiting the set of actions used to create an action chain for simulating an attack by the specific adversary. The logic engine may also assigned weights to actions, which are used to determine action preference for the simulated adversary. For example, an adversary may be known to use certain actions or types of actions when attacking a network and may exhibit a pattern of behavior in employing the actions during an attack. The adversary can be simulated by limiting the actions available for the logic engine to those known to be used by the adversary and by assigning weights to the available actions such that actions that are known to be used more heavily by the adversary are assigned higher weights. Thus, a chain of actions determined by the logic engine can be limited to those actions that an adversary is known to use and can include actions that the adversary is more likely to use.

As mentioned above, the logic engine can generate and maintain a model of a target network to determine a chain of actions that may lead from a current state of the target network to a goal state of the target network. The model can simulate the current state of the target network by representing the current state with a set of fluents—logical predicates and functions. In some embodiments, the fluents may evaluate to either true of false depending on input variables. Fluents can be used to represent both the state of the network and the state of the adversary within the network. For example, a fluent that describes the network can be localAdmin(A, X), which represents the fact that account A is an administrator account on host computer X. A fluent that describes an adversary can be knowsAdmin(A, X), which represents the fact that the adversary knows account A is an administrator on host computer X. In some embodiments, there is no dichotomy between network description fluents and adversary knowledge fluents.

As mentioned above, actions may be represented as a set of preconditions and a set of postconditions. Accordingly, actions can be represented by fluents for the preconditions and postconditions. For example, a lateral movement action can be represented as follows:

Preconditions:

| | |
|---|---|
| executable lateral(X, A) if | Can execute lateral movement if: |
| knowsCreds(A), | Adversary knows credentials for account A |
| hasFoothold(Y), | Adversary has a foothold on computer Y |
| knowsConnected(X, Y), | Adversary knows computers X and Y are connected |
| knowsRemote(A, X), | Adversary knows account A can remotely log in to X |
| escalated(Y), | Adversary is escalated on Y |
| not hasFoothold(X). | Adversary does not have a foothold on X |

Postconditions:

| | |
|---|---|
| caused hasFoothold(X) after lateral(X, A) | The adversary has a foothold on X after laterally moving to X using account A |

In the above example, the action executable lateral(X, A) means execute the lateral movement to computer X using account A. This action can be successfully executed if the following preconditions are met: the adversary knows its credentials for account A; the adversary has a foothold on computer Y; the adversary knows computers X and Y are connected; the adversary knows account A can remotely log into computer X; the adversary is escalated on computer Y; and the adversary does not have a foothold on computer X. In this example, if all of those preconditions are true, then it would be possible for the adversary to execute the lateral movement procedure to move to computer X using account A. The post-condition of lateral movement is hasFoothold X, which means that the adversary has a foothold on computer X after laterally moving to computer X using account A.

Figure 13:
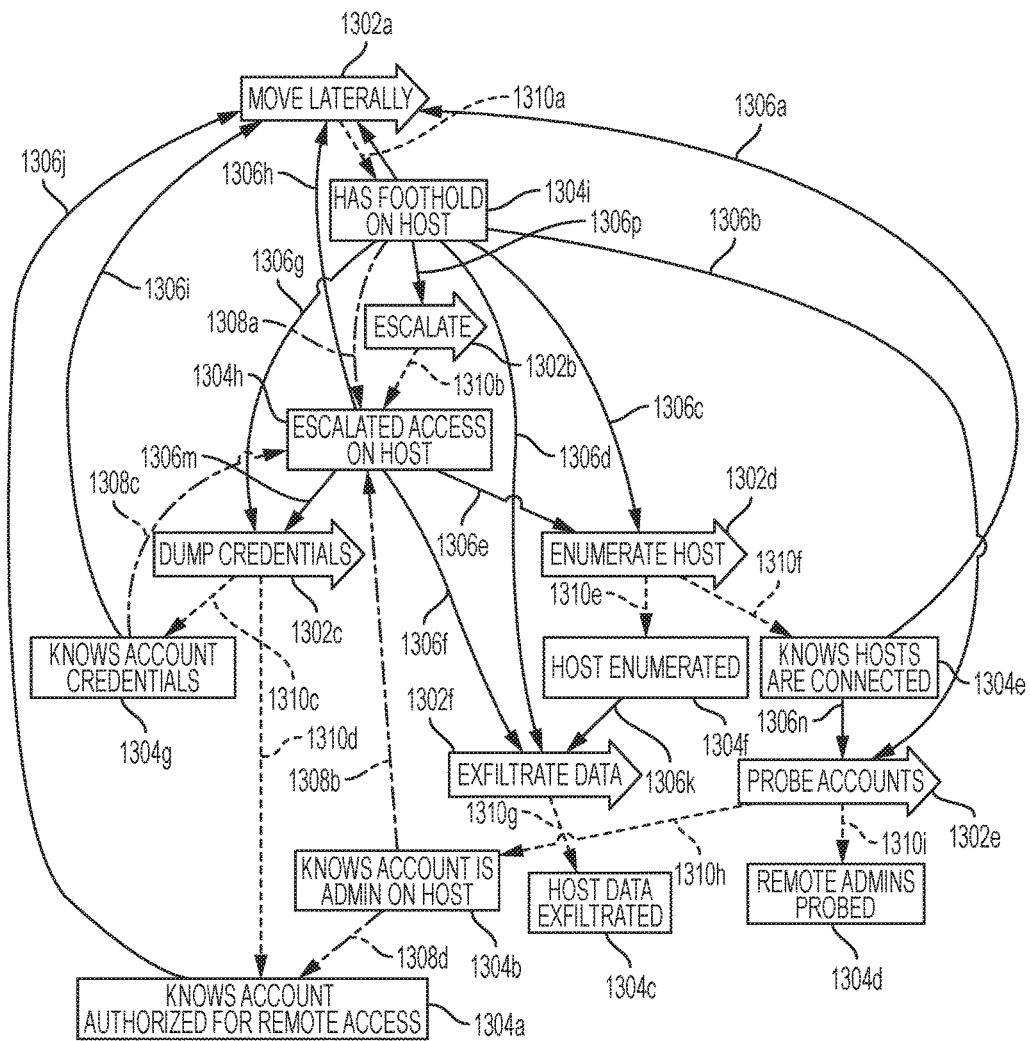
FIG. 13 is an illustration of relationships between preconditions and post conditions for actions, according to certain embodiments.

FIG. 13 illustrates the relationships between the states, the actions that can be executed based on the states, and how the actions modify the states, according to some embodiments. The arrows (1302a-1302f) represent encoded actions. The boxes (1304a-1304h) represent states. Connecting the arrows and boxes are three types of lines, which indicate the states that are preconditions for actions and those that are postconditions for actions. The first type lines (labeled 1306a-1306p) represent preconditions for actions. These arrows lead from the boxes representing the states required for successfully executing the action to which they lead. For example, action "escalate" (arrow 1302b) requires "has foothold on host" (box 1304i) to be true and, thus, first type line 1306p leads from state 1304i to action 1302b to indicate that state 1304i is a precondition for action 1302b.

The second type lines (1310a-1310i) represent postconditions from executing actions. For example, the postcondition from executing action "escalate" (arrow 1302b) is "escalated access on host" (box 1304h), which is represented by line 1310b leading from arrow 1302b to box 1304h. The third type lines (1308a-1308d) represent state inferences from other states. These lines indicate that the existence of a state can be inferred from the existence of another state or other states. For example, if "knows account is admin on host" is true, then "knows account authorized for remote access" is also true. This inference is indicated by line 1308d leading from state 1304b to state 1304a.

The logic engine can use the relationships graphically illustrated in FIG. 13 to chain together actions to move from a current state to a goal state. For example, if a current state includes "has foothold on host" (box 1304i) and a goal state includes "remote admins probed" (box 1304d), the logic engine can determine that the chain of actions: "escalate" (1302b)→"enumerate host" (1302d)→"probe accounts" (1302e) will lead from the current state to the goal state.

Figure 14:
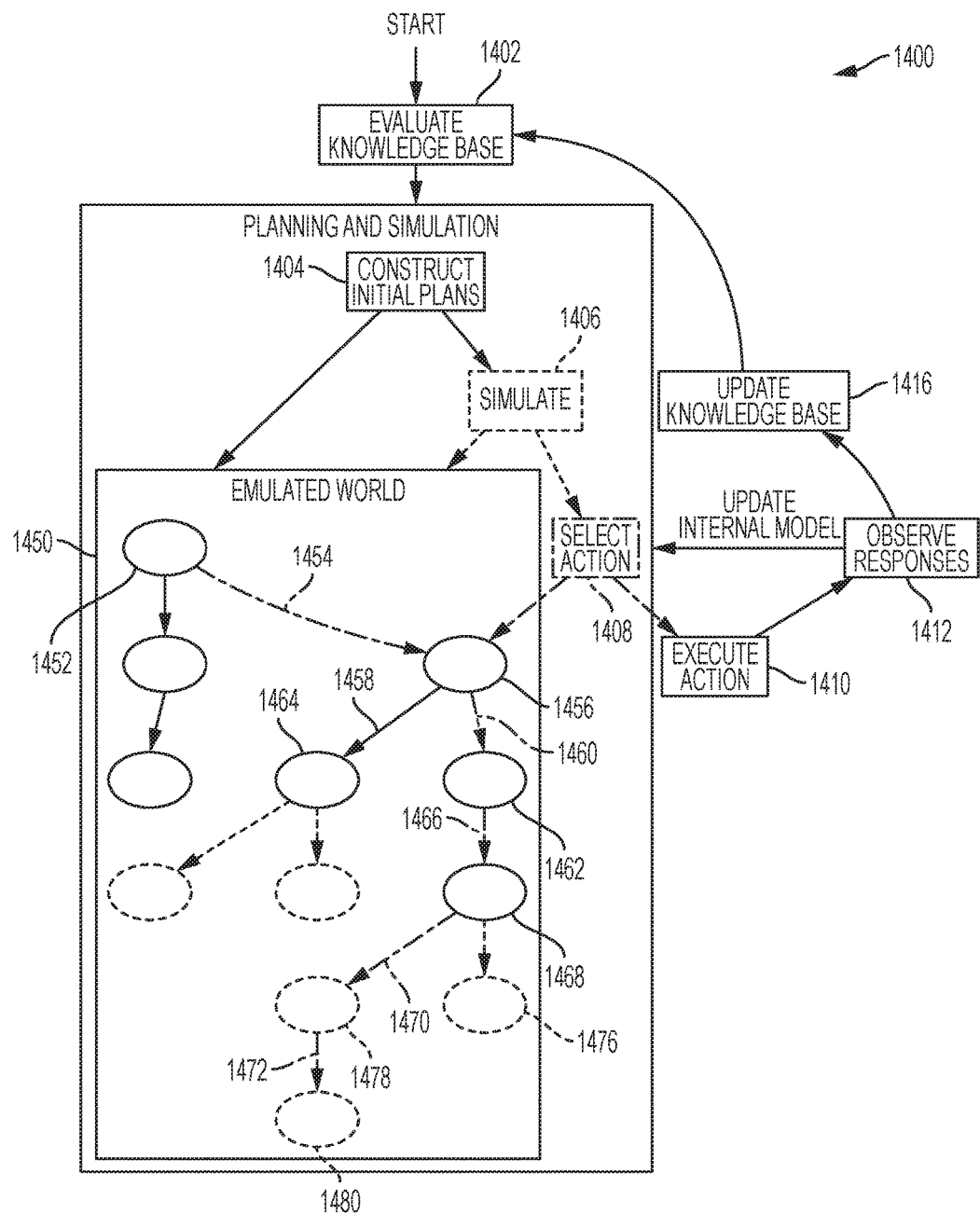
FIG. 14 illustrates a method for generating attack plans, according to certain embodiments.

FIG. 14 illustrates a method of selecting actions during a simulation attack that may be performed by the logic engine of a simulation server, according to some embodiments. At step 1402, the logic engine evaluates the knowledge base to determine the current state of the "world." In this example, "world" is shorthand for the state of the target network and the state of the adversary, in terms of what the adversary knows. In some embodiments, there is no dichotomy between the state of the world and the adversary's knowledge. For example, the server may limit its knowledge of the world to what is known to the simulated adversary.

At step 1404, initial plans are constructed based on the knowledge base. In some embodiments, the initial plans are actions or chains of actions that are based on what is deterministically known about the state of the world. For example, if the current knowledge about the state of the world is sufficient to chain together actions to achieve a goal state, the initial plans may include the complete chain of actions to get from the current state of the world to the goal state of the world. The initial plans may include a chain of actions that would not achieve a goal state but that would achieve some intermediate state between a current state and a goal state.

At the initial stages of a simulated attack, it will often be the case that the current knowledge of the world is insufficient to select a chain of actions that will deterministically achieve a goal state. Thus, according to some embodiments, the logic engine may select actions by incorporating uncertainty into the selection process. By incorporating uncertainty, the logic engine can "guess" at what states may be true and/or what actions may be successful in order to select actions beyond what could be selected based only on what is deterministically known. The incorporation of uncertainty is performed in step 1406 in which the logic engine simulates an attack by guessing at states and/or effectiveness of actions.

For example, where a precondition for the action of lateraling to computer X using account A requires that the adversary knows that account A can remotely log into computer X, the logic engine may select the action if this precondition is known to be true. However, the logic engine may also select this action if the logic engine guesses that this precondition is likely to be true. Thus, the logic engine can simulate an example world by guessing about what exists in the world. Similarly, the logic engine can simulate an example world by guessing at what actions are going to be successful. From those two mechanisms, a deterministic attack plan approach can be used to chain actions together based on, for example, any mixture of known state, guessed states, actions that are known to be successful, and actions that are likely to be successful.

At step 1408, an action is selected for one or more host computers to execute. The action may be selected based only on the initial plans, for example, where the initial plans are sufficient to reach a goal state or a satisfactory intermediate state, or the action may be selected based on simulation, for example, where the current knowledge of the world in insufficient to select an action. At step 1410, instructions are sent to one or more host computers to execute the selected action.

The logic engine may generate and update an emulated world that incorporates the knowledge base, the initial plans, the simulations, and the selected actions. Emulated world 1450 is a simple example of how the logic engine may emulate the world. At an initial stage of a simulated attack, the knowledge base may include known state 1452, which is included in emulated world 1450. The logic engine may know that performing action 1454 will result in state 1456. The logic engine may then know that performing action 1458 from state 1456 will result in state 1464 and that performing action 1460 from state 1456 will result in state 1462, from which action 1466 can be executed to achieve state 1468. Thus, these chains of known states and actions with known outcomes may be included in emulated world 1450. A goal state or an intermediate state may be 1480, and the logic engine may not be able to determine how to achieve the goal state based only on what is known. Thus, the logic engine may guess at states and/or actions and may incorporate the guesses into the emulated world. For example, emulated world 1450 includes probable states 1476 and 1478. Probable states 1476 and 1478 can be states that are likely to be true and/or states that will be true if an uncertain action is successfully executed.

Based on emulated world 1450 the logic engine can plan the chain of actions that link deterministic states and non-deterministic states and lead to the goal state or desired intermediate state. Thus, the logic engine can plan the path that chains actions 1454, 1460, 1466, 1470, and 1472. Based on this plan, the logic engine can select action 1454 at step 1408. The amount of predicted states and/or actions that may be generated by the logic engine may vary and may be configurable. In some embodiments, no predicted states/actions will be included, and the logic engine may rely only on deterministic states and actions. In some embodiments, a logic engine may simulate states and actions to plan a complete attack from the current state to the goal state. In some embodiments, the logic engine may simulate to the point that the probabilities of states is below or above a certain threshold (e.g., built-in or user configurable).

According to some embodiments, the logic engine can simulate a specific adversary by selecting one action or chain of actions over another action or chain of actions based on the known behavior of the adversary. For example, one chain of actions may include move laterally, dump credentials, and then enumerate a host, while another chain of actions (for example, to achieve the same goal state) may include enumerate a host, move laterally, and then dump credentials. The chain selected can be based on known behaviors of the simulated adversary, such as by assigning weights to actions and choosing the chain with the highest total weight.

After the simulation server transmits the instructions to perform a selected action, the server may observe responses from one or more host computers that have executed the instructed action in step 1412. Based on the observed responses, the server can update the knowledge base at step 1416 to incorporate new knowledge about the state of the target network and/or adversary. The new knowledge can be used to update the internal model of the logic engine.

The process may then repeat to select the next action to be performed. Generally, the emulated world of the logic engine will be updated based on the knowledge received from the responses—the world may expand with new states, uncertain states may change to known states, new states may be simulated, etc. Based on the new knowledge and/or on the updated emulated world, the logic engine may continue along a previously generated attack plan and select the next action in the plan, may generate a new attack plan that includes the same next action, or may generate a new attack plan that include a new next action.

Actions

Paths generated by the logic engine can include chains of actions that can be executed by one or more host computers during an attack simulation. According to some embodiments, the actions can be actions that a remote agent running on a client computer can take. For example, actions may be operating system level primitives such as running a command-line command, creating and/or modifying a file, creating and/or modifying a registry key, etc. Each action can be associated, in the logic engine (for example, using the simulation language described herein), with a set of arguments needed to execute the action, which may have default values and, optionally, a list of accepted values. Actions can be linked to other actions such that the logic engine knows which actions are executed in combination and the correct ordering.

Examples of actions used to represent adversary techniques in the logic engine, according to some embodiments, include "sc create," "smb copy," and "lateral move." SC create is the Windows command to create a new service. It can be used to create a service on a remote computer. SC create takes as arguments the name of the remote computer on which the service is to be created and the path to the service executable. The sc create action can be the execution of the command-line command "sc.exe \\$remoteServer$ create myServiceName binPath=$svcPath$." Execution of this command by a computer can create the service "myServiceName" located on another computer ("remoteServer") at "svcPath." According to some embodiments, an instruction sent by a simulation server to a simulation client to execute the sc create action (e.g., based on selecting the action from a path generated by the logic engine) can include the name of the command-line command "sc.exe" and the required parameters. According to some embodiments, an instruction sent from the server to the client includes the string "sc.exe \\$remoteServer$ create myServiceName binPath=$svcPath$."

SMB copy is the Windows command to mount another computer's network share (usually the Admin share) and write a file to the share, which writes the file to the other computer. SMB copy takes as arguments the name of the remote computer, the destination path for the file, and the source path of the file. The SMB copy action can be the execution of the command-line command "cmd/c copy/y $localPath$ \\$remoteServer$\$remotePath$" which instructs the computer executing the command to copy the file pointed to by "localPath" to the remote computer "remoteServer" at the location "remotePath."

According to some embodiments, lateral move is an example of an action that consists of a combination of other actions. According to some embodiments, lateral move includes the actions smb copy and sc create. This action (combination of actions) can be used from a first computer to another computer, e.g., by copying a remote access tool from the first computer to the second computer and creating a new service pointing to that tool.

Figure 12A:
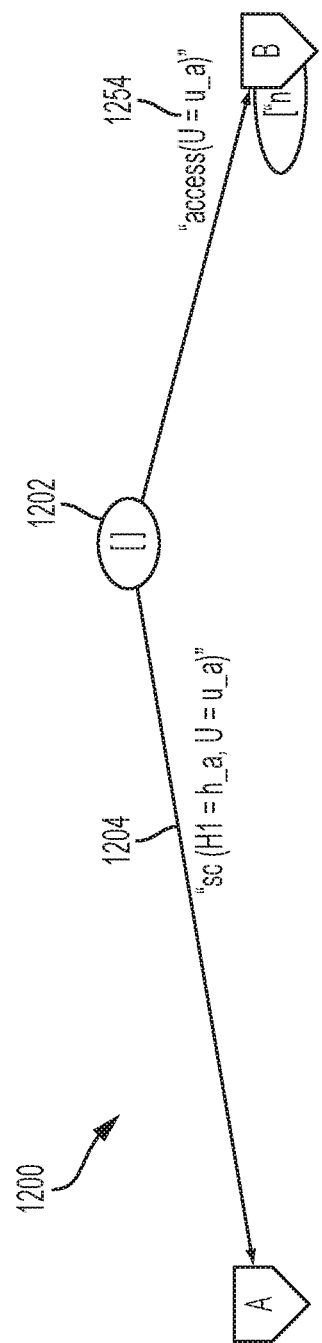
FIGS. 12A, 12B, and 12C illustrate an exemplary predicted cyber attack simulation tree, according to certain embodiments.
Figure 12B:
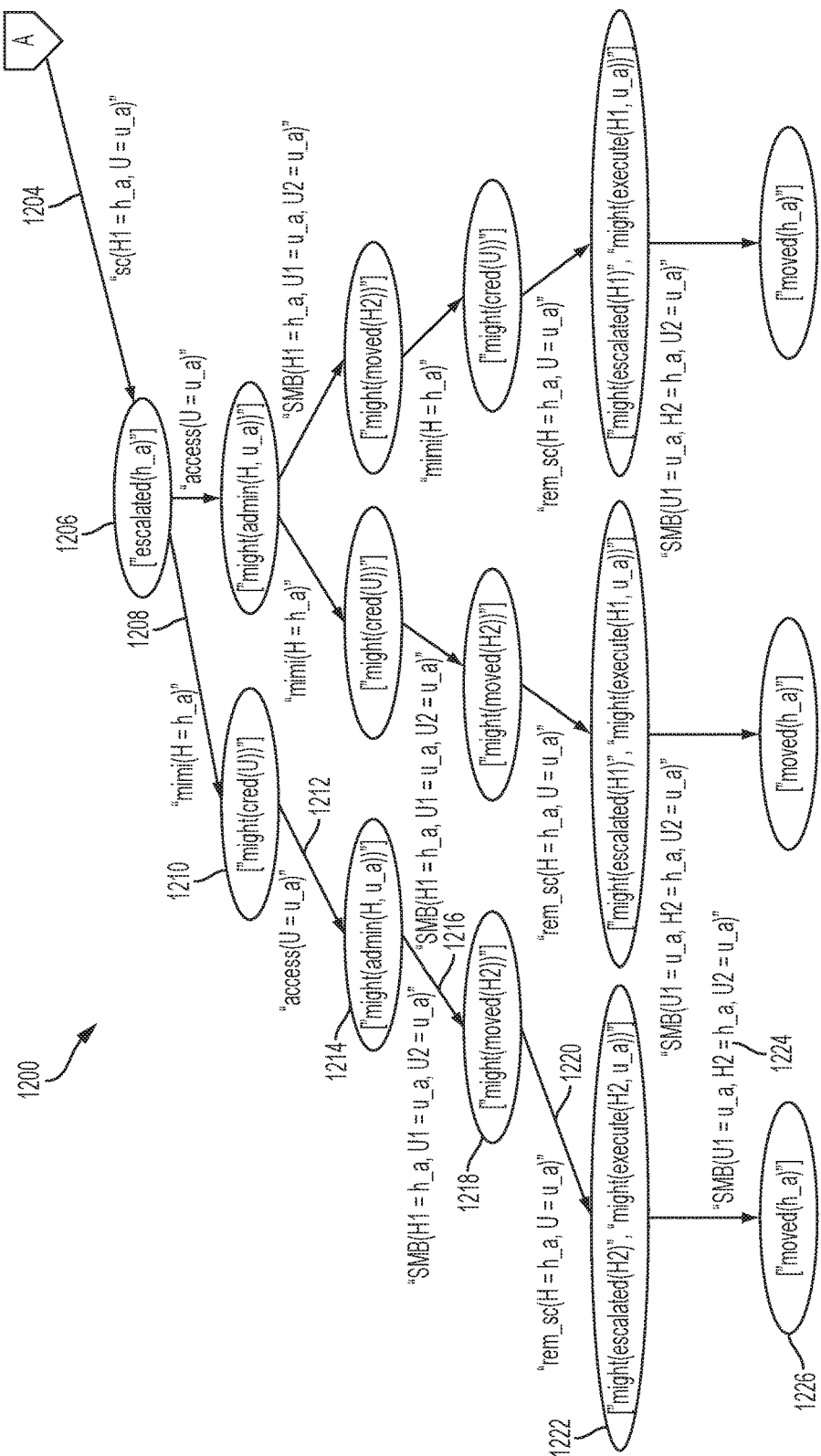
Figure 12C:
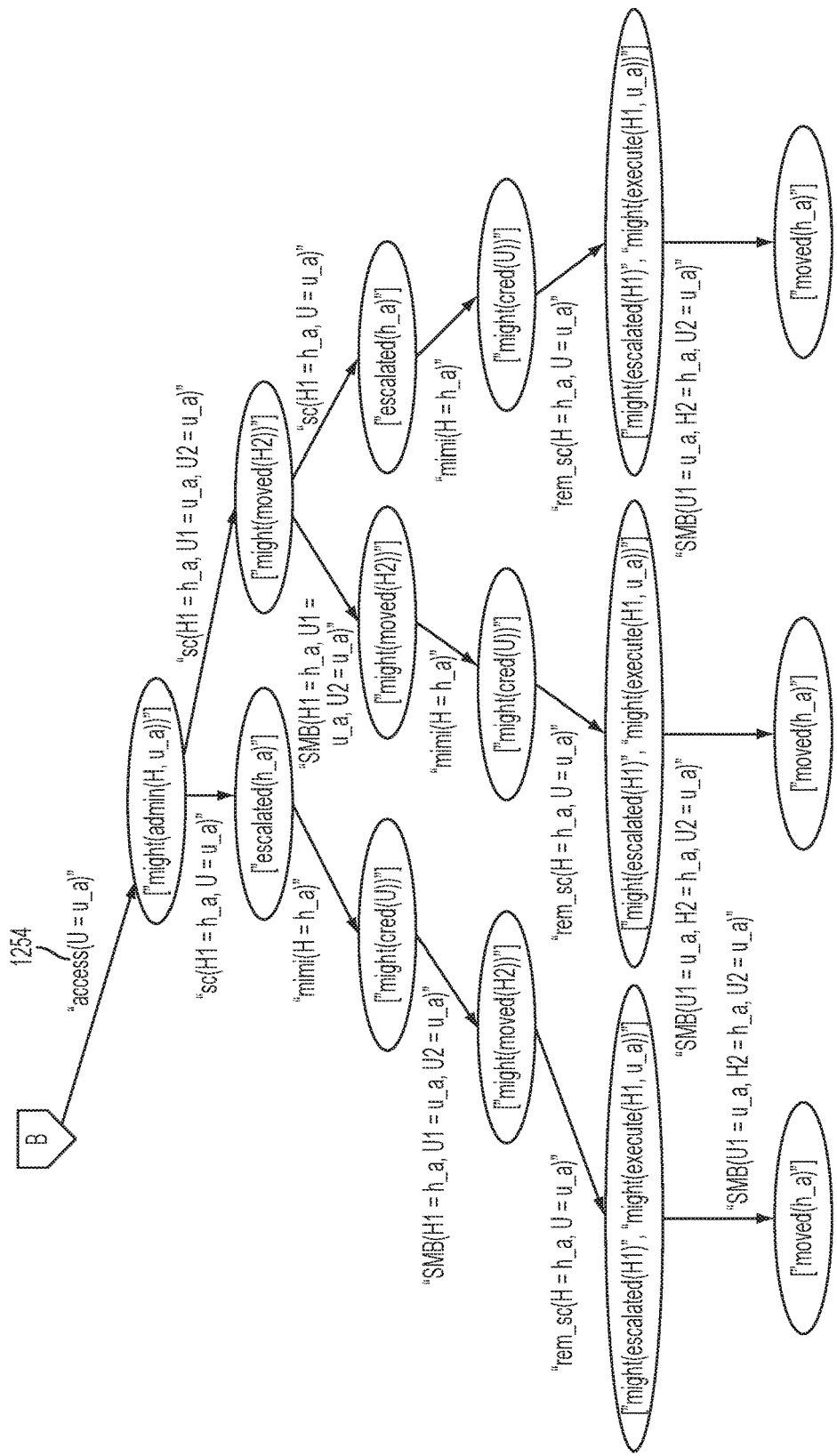

An exemplary predicted attack simulation tree that can be generated by the logic engine, according to some embodiments, is illustrated in FIGS. 12A-C. A predicted attack simulation tree represents the actions that can be taken in a simulated attack and the results of those actions. A predicted attack tree can be generated at the initiation of an attack simulation based on the information known to the logic engine (e.g., as gathered from host computers in the network). Based on the tree, an attack simulation system can select an action for one or more host computers to execute. Throughout a simulation, the logic engine can update the tree or generate a new tree or trees based on new information (such as discovery of new hosts or discovery of new user credentials). According to some embodiments, the logic engine is provided with complete information about the network on which an attack is to be simulated (e.g., as gathered from client modules installed on host computers in the network) and the logic engine produces an attack path tree that accurately reflects the progression of a simulated attack on the network. According to some embodiments, the logic engine is provided with limited information, (e.g., limited to information about a starting host or information about a small number of hosts on a local domain) and the logic engine generates a tree that represents an initial snapshot of the potential progression of an attack simulation. For example, the tree may represent the movement of the simulation from a starting host to a small number of known hosts and not beyond. Upon gathering additional information through execution of instructed actions by host computers, the logic engine can expand the tree to include additional paths and/or extensions of paths.

In FIGS. 12A-C, ovals between edges represent states of a planned/predicted attack simulation. Each state reflects a change (planned or predicted change) within the network. For example, one state can reflect that a user-level account is logged in to a host computer on the network. A subsequent state can reflect that an administrative-level account is logged in to that host computer.

Each edge represents an action or actions that can be executed during a simulation. These actions can represent techniques that may be used by an adversary while operating in a network. The actions included in the tree of FIGS. 12A-B for illustration purposes, include service create ("sc"), lateral movement (by the combination of "SMB copy" and "sc create/start") and credential access (labeled "mimi").

FIG. 12A illustrates starting state 1202 of a planned simulation as generated by the logic engine. Two branches project from state 1202, each of which represents an action that can be taken from the initial state. Action 1204 is a service create action and action 1254 is an access action. Following the action 1204 branch leads to state 1206 in FIG. 12B that represents the new state of the planned simulation system created through execution of action 1204. Action 1204, which is a service create action, includes two parameters. The two parameters are the host, ("A"), which specifies the host that executes the service create action, and the user ("A"), which specifies the user account used to execute the service create action. The result of executing action 1204 is escalation of user privileges on host A which is represented by state 1206 ("escalated(h_a)").

Continuing along the left hand branch in FIG. 12B, the next action 1208 can be executed to achieve state 1210. Action 1208 includes the credential access technique, which is a technique for gathering user credentials on a computer. Once a credential access technique is executed, knowledge of additional user credentials may be gained. According to the embodiment of FIG. 12B, the logic engine does not have perfect knowledge of the network and, therefore, does not know whether execution of the credential access technique at this stage during actual execution of an attack simulation will result gaining credential, or what the credentials might be. Therefore, subsequent states are conditional states that may or may not be achievable depending on what the actual results of executing the credential access technique are during an executed attack simulation. Further states down this branch are wrapped in a "might" condition that specifies that these states are possibilities but not certainties during an attack simulation since they depend from a conditional or unknown state.

Action 1208 (mimi) is executed on host A and the outcome or the changing state is knowledge of one or more credentials, which is represented by state 1210 ("might(cred (U))"). The subsequent action 1212 is access, which checks what access user A has to determine if user A has access to a next host computer that can be the target of this stage of an attack simulation. The outcome of executing action 1212 is (or might be) that user A has admin access to some other host, which is represented by state 1214.

Action 1216 is the SMB copy technique described above, which copies a file from host A as user A to another host, which is not defined, as user A. State 1218 represents that the simulation has (is predicted to) moved to another host ("H2"). Action 1220 is a remote service create, which is the same as a service create except that it is done remotely on host H2 through host A. Action 1220 is used to do a remote service create on the system that moved to (H2) to start the program that we copied over in response to action 1216. The outcome of action 1220, state 1222, is the successful access of H2 and the execution of a program (e.g., a remote access tool) on host H2.

FIG. 12B includes other paths that can be taken. In this example, the end states of each path are all the same ("moved(h_a)"), which illustrates that multiple chains of actions can lead to the same end goal. FIG. 12C includes additional paths that may proceed from the second branch from initial state 1202 starting with action 1254.

According to some embodiments, one or more paths may represent an adversary by matching the actions and pattern of actions that the adversary is known to take. According to some embodiments, during the running of an attack simulation, a path may be selected based on an adversary profile that is reflected in the selection path (e.g., the profiled actions and patterns of actions) in order to simulate that adversary's likely operation within the network. According to some embodiments, during the execution of an attack simulation, a simulation server can select one or more actions from a path of a planned attack tree generated by the logic engine. The simulation server can receive data generated by client nodes in response to execution of one or more actions and the data can be used by the logic engine to update the planned attack tree to enable the simulation server to select a next action or actions.

The logic engine can determine what techniques can be run and in what order based on the preconditions (e.g., user credentials, host computer name) and post-conditions (e.g., result of the execution of an action) to figure out what techniques can be run and in what order. So for example, the logic engine may determine that a credential access technique cannot be executed until service create has been executed. According to some embodiments, the logic engine determines that one action cannot be executed until another action not by a hard rule but by specifying the preconditions for an action (e.g., credential access) and that those preconditions may be post-conditions of the execution of another action (e.g., service create).

Referring back to FIG. 4, the steps of method 400 may be performed based on a predicted attack simulation tree, such as that depicted in FIGS. 12A-C. At step 402, one or more actions from a plurality of actions for operating on a first computer of the plurality of computers are selected by the server. For example, action 1208 (mimi) may be selected. At step 404, one or more instructions are transmitted from the server to the first computer to execute the one or more selected actions. For example, an instruction may be sent to host computer A to execute the credential access technique. At step 406 the first computer executes the one or more selected actions, which results in the generation of data based on the execution of the one or more selected actions. For example, host A executes the credential access technique resulting in the output of data including user credentials (reflecting state 1210). At step 408, the data generated in response to executing the one or more selected actions on the first computer is transmitted from the first computer to the server. For example, host A sends the user credentials to the server. At step 410, the server identifies a target computer of the plurality of computers to access. For example, the server identifies host H2 as the next host to operate within. At step

412, the server instructs the first computer to access the target computer using at least a portion of the data. For example, the server sends instructions to the host A to execute actions 1216 through 1224 to launch a remote access tool on host H2. At step 414, the server receives confirmation from at least one of the first computer and the target computer that the target computer was accessed by the first computer. For example, the server may receive data from host A that the remote access tool file was successfully copied and started and may additionally, or alternatively, receive data from host H2 that the remote access tool was successfully copied to H2 and started.

Figure 5:
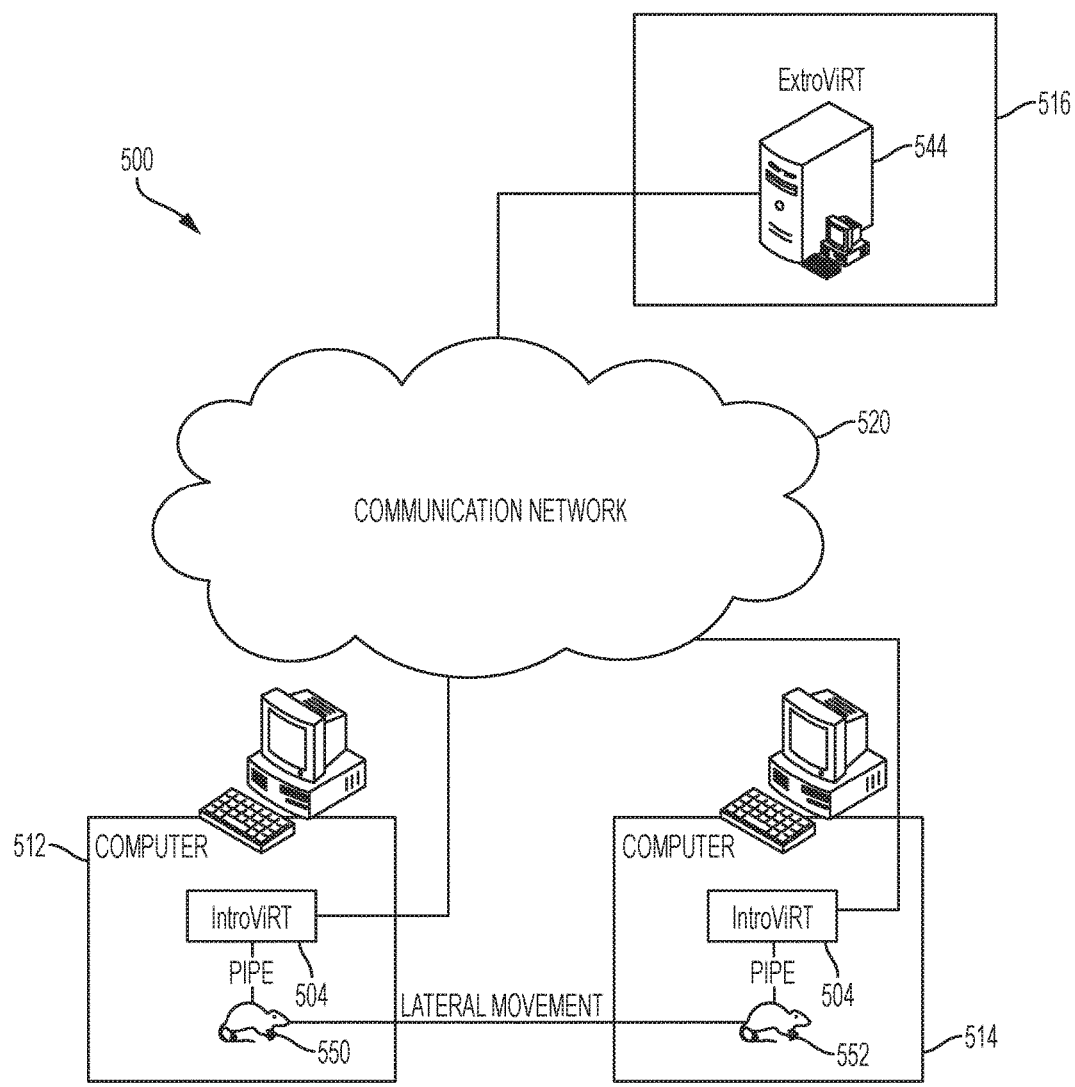
FIG. 5 is an illustration of a computer network attack simulation system according to certain embodiments.

FIG. 5 illustrates system 500 for simulating a cyber-attack on a computer network. System 500 includes client computer 512, client computer 514, and server node 516. Server node 516 and client computers 512 and 514 are interconnected via communication network 520. Client computers 512 and 514 and communication network 520 are components of a computer network on which a cyber attack simulation can be conducted. Server node 516 may be a component of a production node of the computer network or may be an ad hoc component of the computer network that has been connected to the network only for the purposes of executing a simulation.

Server node 516 includes simulation management module 544. Simulation management module 544 (labeled "ExtroViRT" in FIG. 5) includes one or more programs for managing a cyber attack simulation on the computer network. Simulation management module 544 selects actions for client computers to execute, collects and analyzes data received from client computers, and directs the progression of the simulation through the network. Simulation management module 544 also manages the communication between server node 516 and computers 512 and 514, as well as other computers involved in an attack simulation. According to some embodiments, simulation management module 54 establishes encrypted communication channels with client computers.

Client computers 512 and 514 include simulation client 504. Simulation client 504 communicates with server node 516 to receive instructions sent by server node 516 and send data to server node 516. Simulation client 504 translates instructions received from the server node 516 and causes the client computer to execute the instructed actions. Simulation client 504 collects data generated by the execution of actions for communication to server node 516. Data may be, for example, changes to client computer programs or processes or the contents of a file stored on the client computer that are output as a result on an executed command.

According to some embodiments, server node 516 instructs client computer 512 to launch remote access tool 552 according to a common technique used by adversaries once access to a computer has been obtained. One or more actions for launching remote access tool 552 are selected by simulation module 544 and communicated to client computer 512. Simulation client 504 of client computer 512 causes client computer 512 to launch remote access tool 552.

According to some embodiments, server node 516 instructs client computer 512 to conduct a credential dump resulting in the output of user credentials stored on client computer 512. The user credential data is transmitted to server node 516 client computer 512. Server node 516 can then instruct client computer 512 to attempt to access client computer 514 using one or more of the credentials. After client computer 512 successfully accesses client computer 514, server node 516 may instruct client computer 512 to cause remote access tool 552 to be launched on client computer 514.

Figure 6:
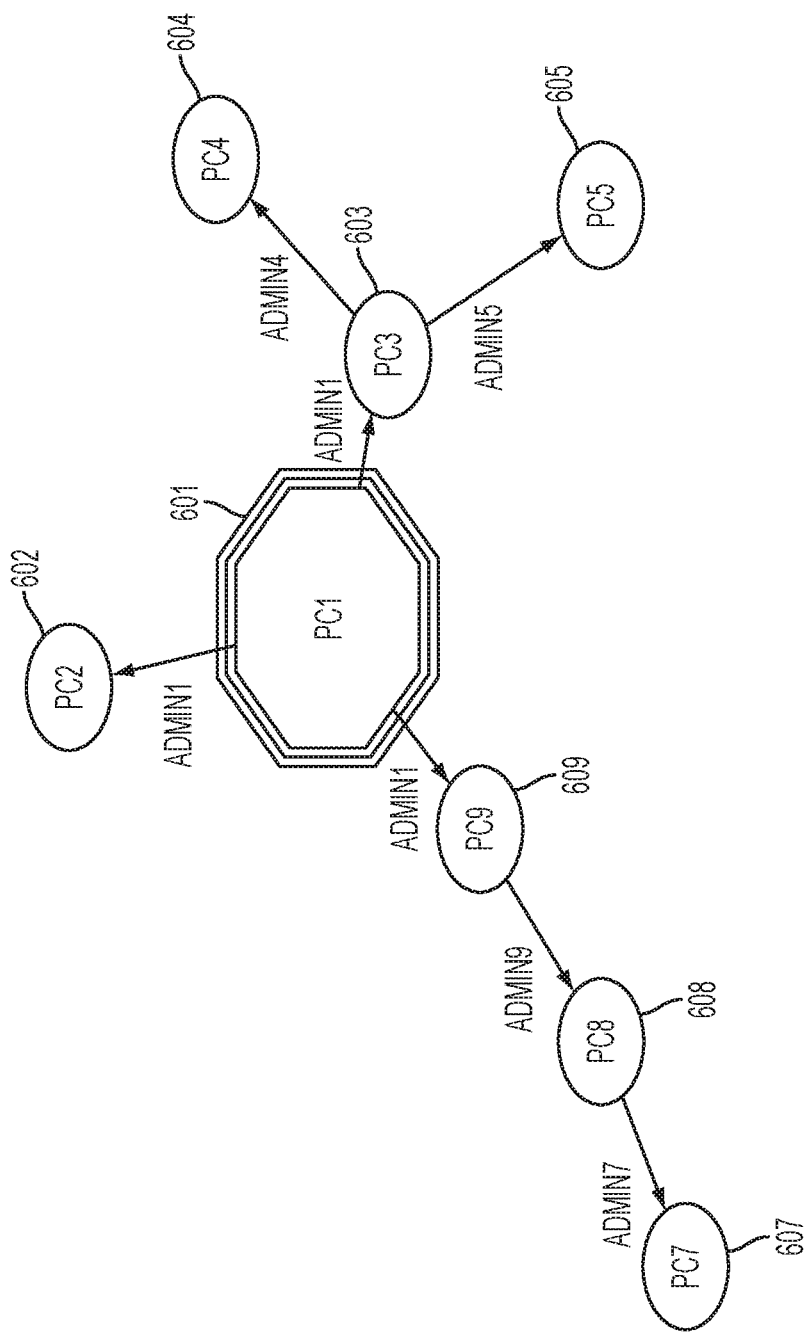
FIG. 6 is an illustration of a computer network attack simulation results visualization tool according to certain embodiments.

FIG. 6 provides a graph of the results of an attack simulation executed by a simulation system, according to some embodiments. The simulation was based on the execution of credential dumping actions to learn user credentials from a node and the use of those credentials to access other nodes. Base node 601 represents the starting point of an attack simulation. This node is a client computer on the network that the simulation assigned as the initial penetration point to the network. The other nodes, 602-605 and 607-609, are client computers that were accessed during the simulation. The arrows indicate the route of access, i.e. from which client another client was accessed. The label "adminX" illustrates the credential used to gain access to the succeeding client computer. For example, from base note 601, an action (e.g., a credential dump) resulted in the collection of a first administrator credential "admin1." Using admin1, the simulation system instructed base node 601 to access client nodes 602, 603, and 609. Using the same techniques, the attack simulation resulted in access of client nodes 604, 605, and 607-609, through collection of additional credentials (admin4, admin5, admin 7, and admin 9). Using the information generated by the simulation system as illustrated in FIG. 6, an administrator can discover which nodes in the network may be accessible post-penetration and how those nodes may be accessed. According to some embodiments, the server system generates and provides graphs, such as the graph of FIG. 6, illustrating the results of an executed simulation. According to some embodiments, a graph is displayed in a graphical user interface (such as a web interface) provided on a display connected to the server system. According to some embodiments, the graph is interactive, allowing a user to select a node or arrow to obtain additional information about the node or simulation actions taken to access the node.

Figure 7:
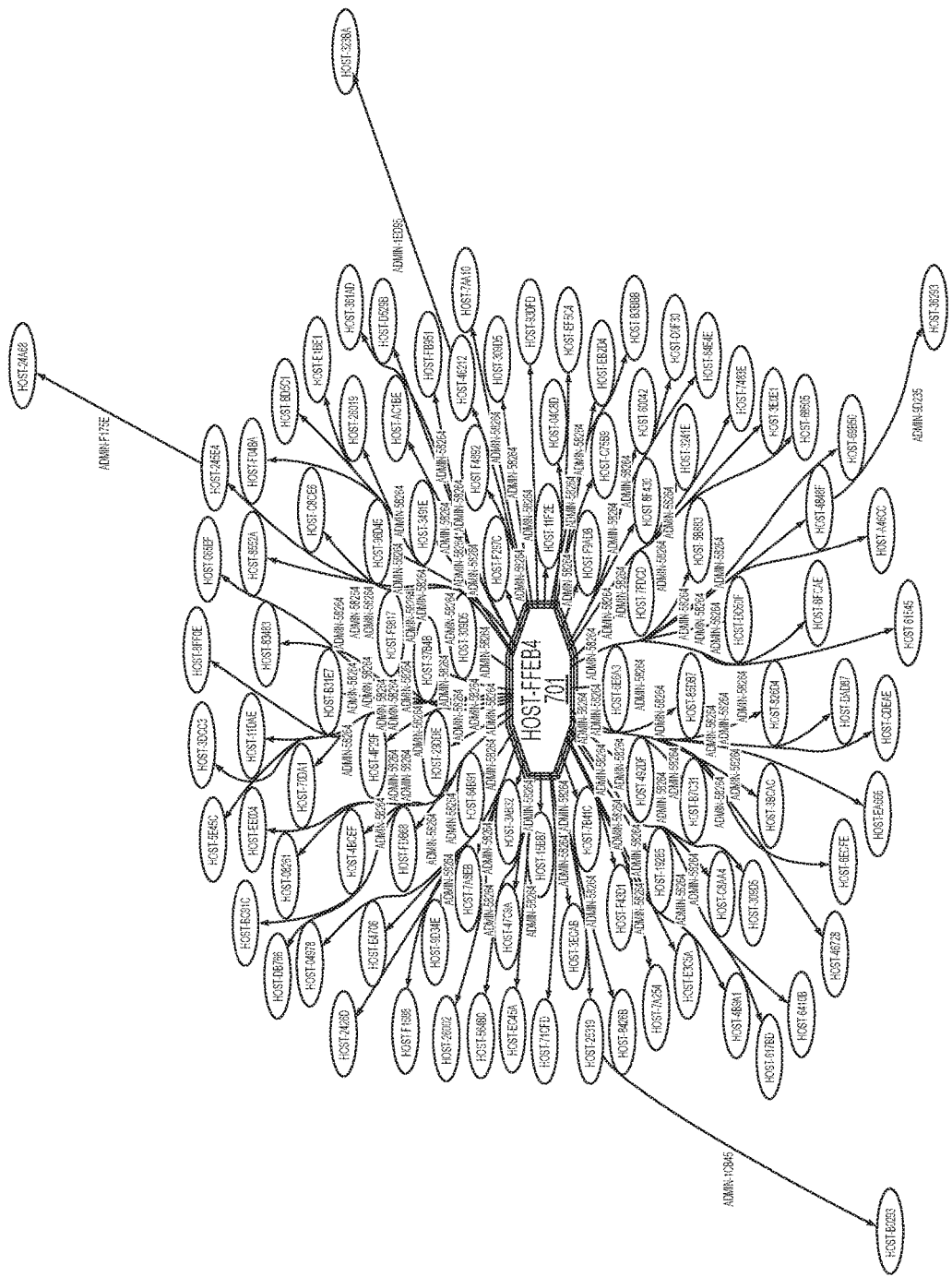
FIG. 7 is an illustration of a computer network attack simulation results visualization tool according to certain embodiments.

FIG. 7 illustrates another example of the results of an attack simulation executed by a simulation system according to some embodiments. In this example, several dozens of nodes were accessed from base node 701 based on credentials obtained from base node 701. This example illustrates that the simulation system, according to some embodiments, is able to execute attack simulations on very large networks that can include dozens of nodes. According to some embodiments, an attack simulation can be conducted on up to hundreds of nodes, up to thousands of nodes, or up to tens of thousands of nodes.

Figure 8:
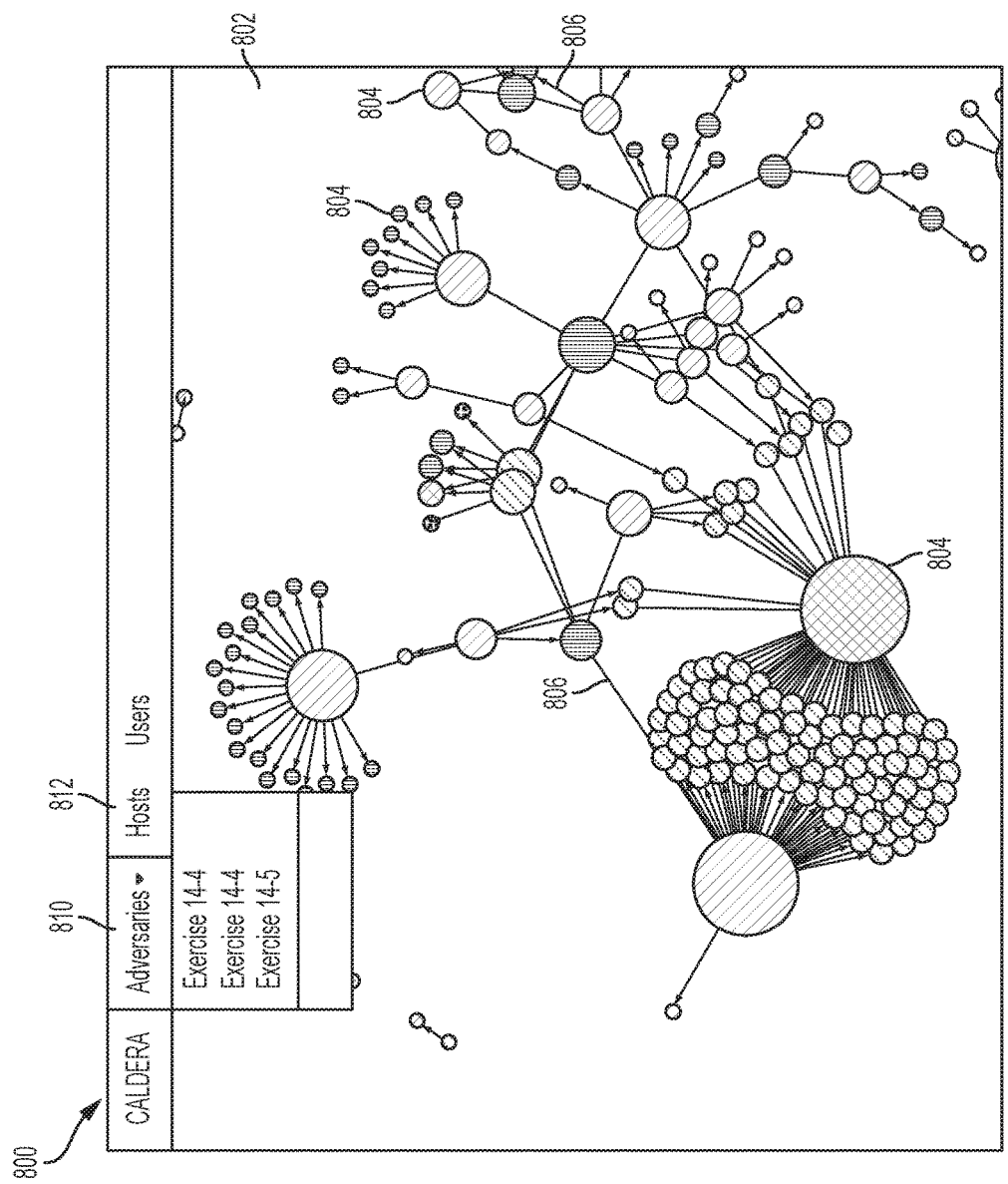
FIG. 8 is an illustration of a computer network attack simulation results visualization tool according to certain embodiments.

FIG. 8 illustrates graphical user interface 800 provided by a server system according to some embodiments. Graph 802 illustrates the data collected during an executed attack simulation. According to some embodiments, the circles (e.g., circles 804) represent network nodes, with the size of the circle being proportional to the number of attack paths that passed through or depended on the node. As in the graphs of FIGS. 7 and 8, arrows 806 between nodes indicate access routes. According to some embodiments, a user may select an arrow to display details about the actions that led to access of one node from another. Adversaries menu 810 provides a list of executed simulations. The executed simulations can represent various adversary behaviors, for example, that can mimic known adversary behavior. Hosts menu 812 enables access to information about host computers in the network, for example to obtain information about the actions taken by a host during the simulation or to view properties of a host, such as operating system.

Tactics and Techniques

Systems, methods, and devices according to some embodiments, may include, or have access to, a database of actions that a client computer may execute during an attack simulation. These actions can be portions of attack tactics, techniques, and procedures that an adversary might use during an actual cyber attack on a network. During attack simulations, a server system, for example, can direct the simulation of one or more tactics and/or techniques by selecting actions from the database that effect the tactics/techniques.

According to some embodiments, the database includes actions that are based on known attack techniques. For example, the database can incorporate the techniques described in the ATT&CK™ model briefly described above. FIG. 9 is an ATT&CK™ graph illustrating the tactics and techniques often used by cyber adversaries that are built into the action database of a simulation server, according to some embodiments. Techniques are organized into tactic categories, which are list on the top row 910. Below each tactic are the techniques 920 associated with the tactic, with some techniques spanning tactic. ATT&CK™ incorporates information on cyber adversaries gathered through research as well as from other disciplines such as penetration testing and Red Teaming to establish a collection of knowledge characterizing the post-access activities of adversaries. ATT&CK focuses on tactics, techniques, and procedures adversaries use to make decisions, expand access, and execute their objectives within a production network. It aims to describe an adversary's steps at a high enough level to be applied widely across platforms, but still maintain enough details to be technically useful.

The nine tactic categories for ATT&CK were derived from the later stages (control, maintain, and execute) of the seven stage Cyber Attack Lifecycle. This provides a deeper level of granularity in describing what can occur during an intrusion after an adversary has acquired access.

Each category contains a listing of techniques that an adversary could use to perform that tactic. The action database, according to some embodiments includes, for each technique, command, utilities, scripts, processes, applications, etc. for performing the technique as well as information about the platform and configurations on which the technique can be successfully performed. According to some embodiments, the selection database also includes information about the risk the technique may pose to a computer, the inputs needed to execute the technique, and the likely results achieved from performing the technique. Below is a brief summary of the tactics and techniques incorporated into the action database, according to some embodiments.

Persistence

Persistence is any access, action or configuration change on a system that gives an adversary a persistent presence on a system. Adversaries will often need to maintain access to systems through interruptions such as system rebooting or other failures that would require a remote access tool to restart in order for them to regain access.

An example of a persistence technique is modifying an existing service. For example, when Windows starts, it also starts programs called services. A service's configuration information, including the start executable, is stored in the registry. Adversaries may modify an existing service to run adversary software by using tools that modify the registry (such as the command "sc") or by directly modifying the registry. Modifying existing services may break existing services or may enable services that are disabled/not commonly used.

Privilege Escalation

Privilege escalation includes an action or technique which results in obtaining a higher level of permissions on a system. Certain tools or actions adversaries employ require a higher level of privilege on the system or network to work. Adversaries may enter a system with unprivileged access and must take advantage of a system weakness to obtain local administrator or SYSTEM privileges. A user account with administrator-like access may also be used, also user accounts with permissions to access specific systems or perform specific functions necessary for the adversary to achieve their objective may also be considered an escalation of privilege.

One example of privilege escalation is to Edit default file handlers. When a file is opened, its file handler is checked to determine which program opens the file. File handlers are stored in the registry and can be edited by programs that have registry access. Applications can modify the file handler for a given file extension to call an arbitrary program when a file with the given extension is opened.

Credential Access

Examples of credential access include credential dumping and credential in files. Credential dumping is obtaining information from weaknesses in operating system or software that can be used to login to the operating system. Utilities do this in many different ways: extracting credential hashes for off-line cracking, extracting plaintext passwords, or finding Kerberos tickets. Examples of credential dumpers include: pwdump7, Windows Credential Editor, Mimikatz, and gsecdump. These tools are in use by both professional security testers and adversaries. Credential dumping is a common technique among adversaries. Examples of specific threat actor groups include ke3chang, Cleaver, and Axiom.

Adversaries may search local file systems and remote file shares for files containing passwords. These can be files created by a user to store their own credentials, shared credential stores for a group of individuals, configuration files containing passwords for a system or service, or source code/binary files containing embedded passwords. It is also possible to extract passwords from backups or saved virtual machines with a credential dumper.

Host Enumeration

Host enumeration describes actions that allow the adversary to gain additional details about the system or network from the system they are currently accessing. When an adversary gains access to a new system they must orient themselves to what they now have control of and what benefits operating from that system give to their current objective or overall goals during the intrusion. There are many native tools provided by the operating system which aid in this post-access information gathering phase.

One example of a host enumeration technique is local networking enumeration in which adversaries may acquire information about local networks, typically using several utilities that describe local network settings. Utilities that may be used to acquire this information are: arp, ipconfig, nbtstat and route. Another example of host enumeration is file system enumeration in which adversaries may enumerate all files and directories in certain areas of a host or remote share or perform a targeted search for specific files or directories. Example commands which acquire this information are: "dir/s" and "findstr".

Defense Evasion

Defense evasion includes actions an adversary take may be for the purpose of evading detection. Sometimes these actions are the same or variations of techniques in other categories that have the added benefit of subverting a particular defense or mitigation. Defense evasion may be considered a set of attributes the adversary applies to all other phases of the operation.

An example of a defense evasion technique is scripting. Adversaries may use scripts to perform actions that would otherwise be manual. Scripting is useful for speeding up operational tasks and reducing the time required to gain access to critical resources. Scripts may be used to bypass process monitoring mechanisms by directly interacting with the operating system at an API level instead of calling other programs. Common scripting languages for Windows include VBScript and PowerShell. Many popular offensive frameworks exist for enabling security testers and adversaries alike. Metasploit, Veil, and PowerSploit are three examples which are popular amongst penetration testers for exploit and post-exploit operations and include many features for evading defenses.

Lateral Movement

Lateral movement techniques allow an adversary to access files or have an effect on a remote system. They often incorporate the ability to remotely execute scripts or code, but that is not always the purpose; as adversaries may reduce their tool footprint on the network by only using legitimate credentials and access methods to remotely connect to systems. Movement from one system on a network to another is often necessary to achieve an adversary's goals.

One example of a lateral movement technique is logon scripts. Windows allows logon scripts to be run whenever a specific user or users logon to a system. If adversaries can access these scripts, they may insert additional code into the logon script. This code can allow them to maintain persistence or move laterally within an enclave because it is executed every time the affected user or users logon to a computer. Modifying logon scripts can effectively bypass workstation and enclave firewalls. Depending on the access configuration of the logon scripts, either local credentials or a remote administrative account may be necessary.

Another example of lateral movement is pass the hash. Pass the hash (PtH) is a method of authenticating as a user without having access to the user's cleartext password. This method bypasses standard authentication steps that require a cleartext password, moving directly into the portion of the authentication that uses the password hash. In this technique, valid password hashes for the account being used are captured using a Credential Access technique. Captured hashes are used with Pass the hash to authenticate as that user. Once authenticated, PtH may be used to logon to remote or local systems. Windows 7 and higher with KB2871997 requires valid domain user credentials or RID 500 administrator hashes.

Execution

An action which results in execution of adversary controlled code on a local or remote system. This phase is often used in conjunction with lateral movement to expand access to remote systems on a network.

Examples of execution techniques are command line, file access, PowerShell, and registry. Command line includes running executable code from the command line. This can be done locally or remotely via RDP, reverse-shell, etc. Command runs with current permissions. File access causes a file to execute based on file location or file creation/modification. This includes things like startup folders and DLL hijacking. PowerShell is used to execute code via numerous techniques (e.g. Start-process, invoke-command, etc.). Administrator permissions may be required for remote use. Registry describes Causing a file to execute based on a registry entry (e.g. run keys). Access to specific areas of the registry depends on account permissions.

Command and Control

Command and control incorporates the ways an adversary can communicate with remote systems under their control. There are many ways an adversary can do this depending on the circumstances with various levels of covertness and detectability. Due to the wide degree of variation available to the adversary, only the most common factors were used to describe the differences in command and control. There is still a great deal of specific techniques within the documented methods. It was difficult to effectively break down command and control into sub-techniques because of how much variation and flexibility is available to the adversary. There are numerous legitimate protocols and communication transports available, so the techniques are more like tactic sub-categories. The resulting breakdown should be enlightening in that focusing on methods of detecting adversaries through command and control protocols is a losing proposition over the long teem. The adversary's only constraint is testing and deployment of tools to rapidly change their protocols, or be enough aware of existing defensive technologies to essentially make their tools indistinguishable from benign traffic at the network layer.

One example of a command and control technique is commonly used port. Adversaries may communicate over a commonly used port to bypass firewalls or network detection systems and to blend with normal network activity to better avoid more detailed inspection. They may use commonly open ports such as TCP:80 (HTTP), TCP:443 (HTTPS), TCP:25 (SMTP) and TCP/UDP:53 (DNS). They may use the protocol associated with the port or use a completely different protocol. For connections that occur internally within an enclave (such as those between a proxy or pivot node and other nodes), common ports are TCP/UDP:135 (RPC), TCP/UDP:22 (SSH), and TCP/UDP:3389 (RDP).

Exfiltration

Actions and attributes which result or aid in the adversary removing files and information from a network. This category also covers locations on a system or network where the adversary may look for data to exfiltrate.

One example of an exfiltration technique is automated or scripted exfiltration in which Data may be rapidly exfiltrated through the use of automated processing or scripting. This may include automated searching and downloading of files matching criteria or downloads of entire directory structures. Another example is exfiltration from the local system in which the data that is exfiltrated comes from local sources such as the file system, processes or system configuration information.

The above description of the tactics and techniques is a summary of a sample of the tactics, techniques, and common knowledge described in the ATT&CK™ model and is not intended to be limiting. Additional tactics and techniques that are part of the ATT&CK™ model and that may be included systems, methods, and devices in accordance with some embodiments are included in the attached Appendix, which is incorporated herein in its entirety.

Actions that may be selected, according to some embodiments, may incorporate one or more of or one or more portions of the above tactics and techniques, of other tactics and techniques in the ATT&CK™ model, or other action that an adversary may take while operating in a computer network. One of ordinary skill in the art can understand that actions incorporating additional tactics, techniques, and common knowledge can be described in accordance with the embodiments described herein. Furthermore, one of ordinary skill in the art can understand that the actions of cyber adversaries are constantly evolving based on the introduction of new technology and new defensive mechanism and, therefore, the actions used to simulate adversary operations selected according to some embodiments will also evolve. According to some embodiments, a simulation system may receive updates to update an action database to reflect newly uncovered adversary actions. According to other embodiments, an action database can be maintained and updated remotely from the simulation system and the simulation system can query the action database to select actions during a simulation and/or receive code from the action database (for example, the action database may be managed incorporated into a server accessible by the simulation system over the internet).

Figure 10:
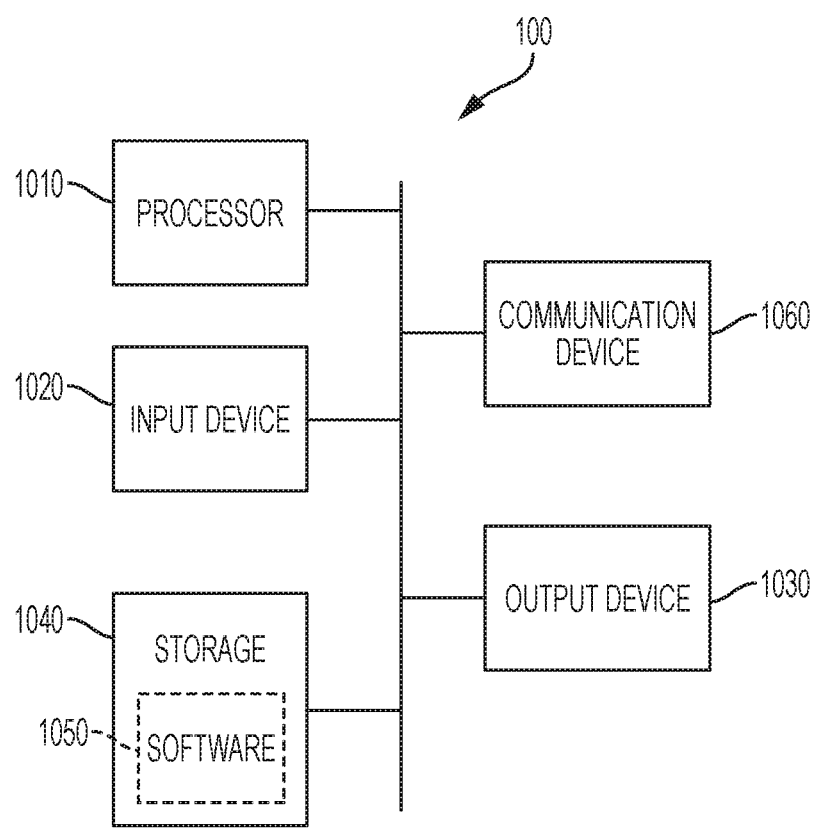
FIG. 10 is an illustration of a computer, according to certain embodiments.

FIG. 10 illustrates an example of a computer in accordance with one embodiment. Computer 1000 can be a host computer connected to a network. Computer 1000 can be a client computer or a server. As shown in FIG. 10, computer 1000 can be any suitable type of microprocessor-based device, such as a personal computer, workstation, server or handheld computing device such as a phone or tablet. The computer can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen or monitor, keyboard, mouse, or voice-recognition device. Output device 1030 can be any suitable device that provides output, such as a touch screen, monitor, printer, disk drive, or speaker.

Storage 1040 can be any suitable device the provides storage, such as an electrical, magnetic or optical memory including a RAM, cache, hard drive, CD-ROM drive, tape drive or removable storage disk. Communication device 1060 can include any suitable device capable of transmitting and receiving signals over a network, such as a network interface chip or card. The components of the computer can be connected in any suitable manner, such as via a physical bus or wirelessly.

Software 1050, which can be stored in storage 1040 and executed by processor 1310, can include, for example, the programming that embodies the functionality of the present disclosure (e.g., as embodied in the computers, servers and devices as described above). In some embodiments, software 1050 can include a combination of servers such as application servers and database servers.

Software 1050 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Computer 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed as new and desired to be protected by Letters Patent of the United States is:

1. A computer network attack simulation server system comprising:
    a network connection for connecting the server system to a plurality of computers on the computer network;
    one or more processors;
    memory; and
    one or more programs, wherein the one or more programs are stored in the memory and configured to be executed by the one or more processors, the one or more programs including instructions for:
        detecting a configuration of at least a portion of the computer network by communicating with simulation client applications running on the plurality of computers;
        after detecting the configuration of at least a portion of the computer network, selecting one or more actions from a plurality of actions for operating on a first computer of the plurality of computers;
        sending instructions from the server system to a simulation client application running on the first computer instructing the simulation client application to cause the first computer to execute the one or more selected actions;

receiving, from the simulation client application running on the first computer, data generated in response to the first computer executing the one or more selected actions;

identifying a target computer of the plurality of computers to access, wherein the target computer is running the simulation client application;

sending instructions from the server system to the simulation client application running on the first computer instructing the simulation client application to cause the first computer to access the target computer using at least a portion of the data;

receiving confirmation from at least one of the simulation client application running on the first computer and the simulation client application running on the target computer that the target computer was accessed by the first computer; and sending instructions from the server system to the simulation client application running on the first computer instructing the simulation client application to cause the first computer to install a remote access tool on the target computer.

2. The server system of claim 1, further comprising instructions for determining which action or actions generated the at least a portion of the data used to access the target computer.

3. The server system of claim 1, further comprising instructions for:

selecting one or more second actions from the plurality of actions for operating on the target computer of the plurality of computers;

instructing the simulation client application running on the target computer to cause the target computer to execute the one or more selected second actions;

receiving, from the simulation client application running on the target computer, second data generated in response to the target computer executing the one or more selected second actions;

identifying a second target computer of the plurality of computers to access, wherein the second target computer is running the simulation client application;

instructing the simulation client application running on the target computer to access the second target computer using at least a portion of the second data; and receiving confirmation from at least one of the simulation client application running on the target computer and the simulation client application running on the second target computer that the second target computer was accessed by the first computer.

4. The server system of claim 1, wherein the computer network comprises the server, the first computer, and the target computer.

5. The server system of claim 1, wherein the data comprises information stored on the first computer.

6. The server system of claim 1, wherein the one or more selected actions are selected based on one or more tactics, wherein the one or more tactics include at least one of persistence, privilege escalation, credential access, host enumeration, defense evasion, lateral movement, execution, command and control, and exfiltration.

7. The server system of claim 1, wherein the computer network is a production computer network.

8. A computer network attack simulation server method comprising:

detecting a configuration of at least a portion of a computer network by communicating with simulation client applications running on a plurality of computers connected to the computer network;

after detecting the configuration of at least a portion of the computer network, selecting one or more actions from a plurality of actions for operating on a first computer of the plurality of computers connected to the computer network;

sending instructions to a simulation client application running on the first computer instructing the simulation client application to cause the first computer to execute the one or more selected actions;

receiving, from the simulation client application running on the first computer, data generated in response to the first computer executing the one or more selected actions;

identifying a target computer of the plurality of computers to access, wherein the target computer is running the simulation client application;

sending instructions to the simulation client application running on the first computer instructing the simulation client application to cause the first computer to access the target computer using at least a portion of the data;

receiving confirmation from at least one of the simulation client application running on the first computer and the simulation client application running on the target computer that the target computer was accessed by the first computer; and sending instructions to the simulation client application running on the first computer instructing the simulation client application to cause the first computer to install a remote access tool on the target computer.

9. The method of claim 8, further comprising determining which action or actions generated the at least a portion of the data used to access the target computer.

10. The method of claim 8, further comprising:

selecting one or more second actions from the plurality of actions for operating on the target computer of the plurality of computers;

sending instructions to the simulation client application running on the target computer instructing the simulation client to cause the target computer to execute the one or more selected second actions;

receiving, from the simulation client application running on the target computer, second data generated in response to the target computer executing the one or more selected second actions;

identifying a second target computer of the plurality of computers to access, wherein the second target computer is running the simulation client application;

sending instructions to the simulation client application running on the target computer instructing the simulation client application to cause the target computer to access the second target computer using at least a portion of the second data; and receiving confirmation from at least one of the simulation client application running on the target computer and the simulation client application running on the second target computer that the second target computer was accessed by the first computer.

11. The method of claim 8, wherein the computer network comprises a server that instructs the simulation client applications running on the first computer and the target computer.

12. The method of claim 8, wherein the data comprises information stored on the first computer.

13. The method of claim 8, wherein the one or more selected actions are selected based on one or more tactics, wherein the one or more tactics include at least one of persistence, privilege escalation, credential access, host enumeration, defense evasion, lateral movement, execution, command and control, and exfiltration.

14. The method of claim 8, wherein the computer network is a production computer network.

15. A non-transitory computer readable storage medium comprising one or more programs, which when executed by a computer network attack simulation server, cause the server to:
- detect a configuration of at least a portion of a computer network by communicating with simulation client applications running on a plurality of computers connected to the computer network;
- after detecting the configuration of at least a portion of the computer network, select one or more actions from a plurality of actions for operating on a first computer of the plurality of computers connected to the computer network;
- send instructions from the server to a simulation client application running on the first computer to instruct the simulation client application to cause the first computer to execute the one or more selected actions;
- receive, from the simulation client application running on the first computer, data generated in response to the first computer executing the one or more selected actions;
- identify a target computer of the plurality of computers to access, wherein the target computer is running the simulation client application;
- send instructions from the server to the simulation client application running on the first computer to instruct the simulation client application to cause the first computer to access the target computer using at least a portion of the data;
- receive confirmation from at least one of the simulation client application running on the first computer and the simulation client application running on the target computer that the target computer was accessed by the first computer; and
- send instructions to the simulation client application running on the first computer instructing the simulation client application to cause the first computer to install a remote access tool on the target computer.

16. The non-transitory computer readable storage medium of claim 15, wherein the one or more executed programs cause the server to determine which action or actions generated the at least a portion of the data used to access the target computer.

17. The non-transitory computer readable storage medium of claim 15, wherein the one or more executed programs cause the server to:
- select one or more second actions from the plurality of actions for operating on the target computer of the plurality of computers;
- send instructions to the simulation client application running on the target computer instructing the simulation client to cause the target computer to execute the one or more selected second actions;
- receive, from the simulation client application running on the target computer, second data generated in response to the target computer executing the one or more selected second actions;
- identify a second target computer of the plurality of computers to access, wherein the second target computer is running the simulation client application;
- send instructions to the simulation client application running on the target computer instructing the simulation client application to cause the target computer to access the second target computer using at least a portion of the second data; and
- receive confirmation from at least one of the simulation client application running on the target computer and the simulation client application running on the second target computer that the second target computer was accessed by the first computer.

18. The non-transitory computer readable storage medium of claim 15, wherein the computer network comprises a server that instructs the simulation client applications running on the first computer and the target computer.

19. The non-transitory computer readable storage medium of claim 15, wherein the data comprises information stored on the first computer.

20. The non-transitory computer readable storage medium of claim 15, wherein the one or more selected actions are selected based on one or more tactics, wherein the one or more tactics include at least one of persistence, privilege escalation, credential access, host enumeration, defense evasion, lateral movement, execution, command and control, and exfiltration.

21. The non-transitory computer readable storage medium of claim 15, wherein the computer network is a production computer network.

* * * * *